April 7, 1970 N. T. EVANS 3,505,649

DATA PROCESSOR

Filed Oct. 10, 1966 14 Sheets-Sheet 1

INVENTOR.
NOROL T. EVANS,
BY Victor Syrchunda
AGENT.

April 7, 1970 N. T. EVANS 3,505,649

DATA PROCESSOR

Filed Oct. 10, 1966 14 Sheets-Sheet 5

THRESHOLD LOGIC

April 7, 1970 N. T. EVANS 3,505,649
DATA PROCESSOR
Filed Oct. 10, 1966 14 Sheets-Sheet 11

April 7, 1970 N. T. EVANS 3,505,649

DATA PROCESSOR

Filed Oct. 10, 1966 14 Sheets-Sheet 14

United States Patent Office 3,505,649
Patented Apr. 7, 1970

3,505,649
DATA PROCESSOR

Norol T. Evans, San Pedro, Calif., assignor to Hughes Aircraft Company, Culver City, Calif., a corporation of Delaware Filed Oct. 10, 1966, Ser. No. 585,644
Int. Cl. G05b *13/00;* G06f *3/00*
U.S. Cl. 340—172.5 10 Claims

ABSTRACT OF THE DISCLOSURE

The present invention distinguishes valid targets from invalid targets in a stacked beam radar surveillance system due to specific signals on one beam, two adjacent beams, or three adjacent beams. During each range bin interval, data words are circulated through the data processor, which words contain the weight of particular range bins on specific beams and are increased by two increments for a hit and decreased by one increment for a miss. When the data words of single or adjacent beams reach predetermined values, a valid target is indicated on a specific beam.

This invention relates to data processing apparatus for processing data input signals in the form of digital pulses and more particularly to a data processing system which is capable of distinguishing data in a first condition from data in a second condition.

The present invention is especially useful, as an example, with radar surveillance systems or the like. Radar systems of this nature receive video return signals in response to exploratory pulses. Upon receipt thereof the video signals are first quantized or digitized with comparison methods to a clock signal initiated after each exploratory pulse, i.e., the undeveloped video signals are converted to a series of ones and zeroes by a video quantizer depending on whether the video return exceeds or does not exceed a threshold level respectively. A video return which exceeds the threshold level of the video quantizer is referred to as a "hit." A video signal that does not exceed the threshold level is referred to as a "miss." A need has developed for an automatic detection system for the automatic processing of the video return from a surveillance radar for determining a ratio of hits and misses which may constitute a valid target or an invalid target.

In automatic processing system now in existence, valid targets are usually generated by exceeding the aforesaid threshold count of quantized (digitized) video hits. This is usually determined by a sequential observer type counter or "sliding window" type threshold count detector. These devices indicate the valid radar target return when the number of digital video hits exceed the threshold count value within a particular range increment (range bin). However, whether returns, radar interference and jamming, etc., which amount to noise on the receiver may produce sufficient hits in a range bin to indicate a valid target return. In some systems all target reports are stored in a computer memory and processed by the computer to distinguish between valid and invalid target reports.

Video signal returns from a single scan beam received by a radar receiver may have a plurality of signals which exceed the threshold level because of the aforesaid reasons. In these cases not all, if any, of these returns can be classified as a target. In figuring on a probability scale, it has been determined that a hit would allow a counter to count up N bits, say for example two increments, and count down $N/2$ bits or one increment for a miss. The probability of a false alarm rate is calculated on an individual hit basis. It has been found by calculations that should the counter, counting its hits and misses is an individual range bin, reach a count of thirteen, there is a probability of $1.7\times10^{-6}$ that the count is a false alarm. Therefore, it is considered that when a count of thirteen has been attained the probabilities of it being a valid target are very high.

Prior art systems employ techniques of assuming that N out of M hits indicate a valid target require, for example, majority logic which is enabled on N out of M the data processing machines used therewith will indicate that a target has been registered. Typical majority logic is enabled if 8 video returns, out of 11 indicate a hit, a target is indicated. Too, once the majority logic has been enabled it will continue to register a target until appropriate minority logic is enabled, for example, the video returns fall below 5 hits out of the aforesaid 11.

These prior art processing system require that when a stacked beam radar system is used, all of the video inputs are summed in the video quantizer as they are received from the radar receiver. All of the noise of each receiver is also summed and a collapsing loss occurs and consequently the range of the machine itself is greatly reduced.

In one particular concept of this invention a plurality of stacked beams from a radar surveillance system is processed detecting a target due to specified signals on one on beam, on two adjacent beams, or three adjacent beams. This takes into consideration the hits-per-return ratio of either a single beam or single beam pulse one or both adjacent beams.

At each range bin interval which corresponds to the radar pulse width, a four-bit word will be read out of and written back into an associated memory. This four-bit word may be contained in a reversible binary counter which counts up two increments for a hit or a binary one applied thereto and counts down one increment for a miss and is designated as a binary zero. The total count possible in the four-bit word is 16. In one embodiment of this invention a counter is provided for each radar beam and each counter processes a single range bin in a sequential order. After a range bin has been processed its condition found on a single sample is combined with the data of its particular condition previously stored in its address and then returned to memory at its particular location.

One object if this invention is to provide a novel and improved data processor which automatically processes digital input data on a real time basis.

Another object of this invention is to provide a novel and improved data processor useful for determining valid targets from invalid targets in response to radar video pulses.

Another object of this invention is to provide a novel and improved data processor which implements and computes a specified event by application of a pulse to pulse correlation process.

These and other objects, features and advantages will become apparent to those skilled in the art when referring to the following detailed description of one preferred embodiment and referenced to the following figures illustrating preferred embodiments of this invention wherein.

Figure 4:
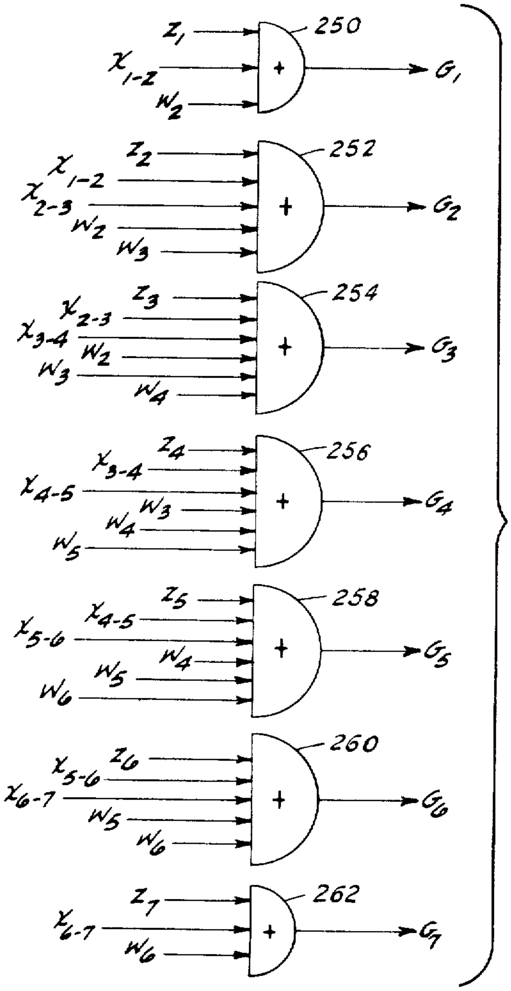
Figure 6:
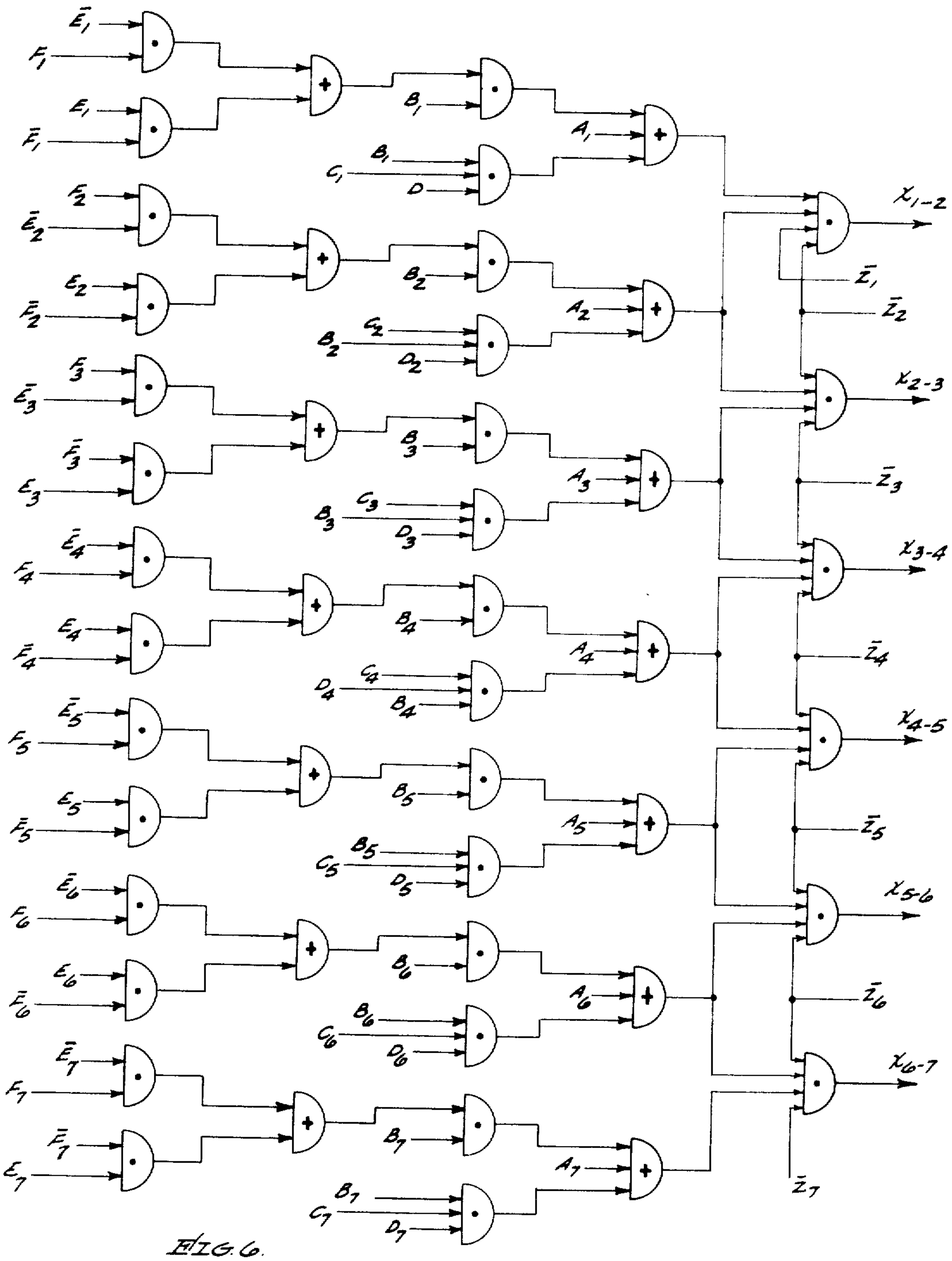
Figure 7A:
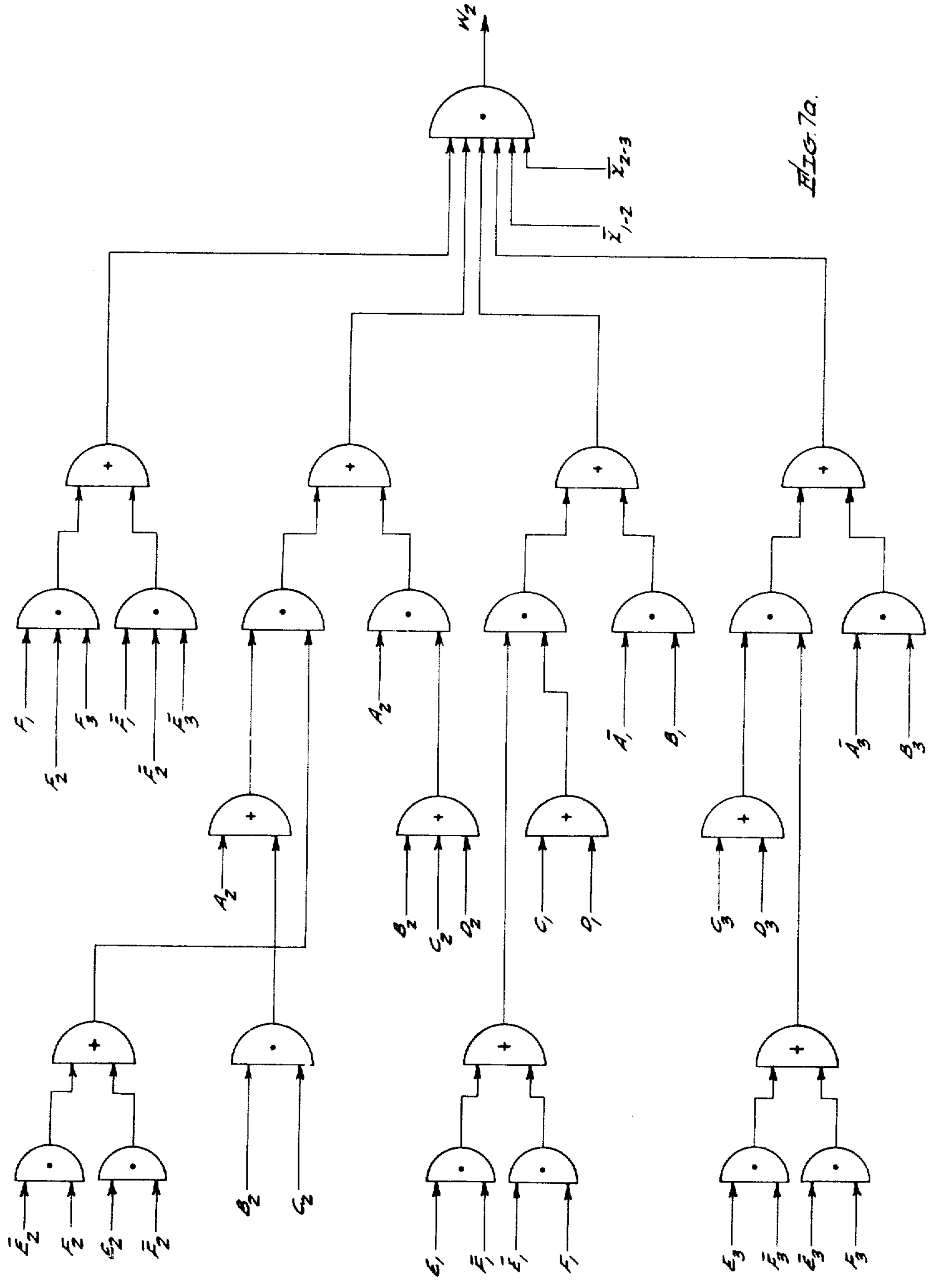
Figure 7B:
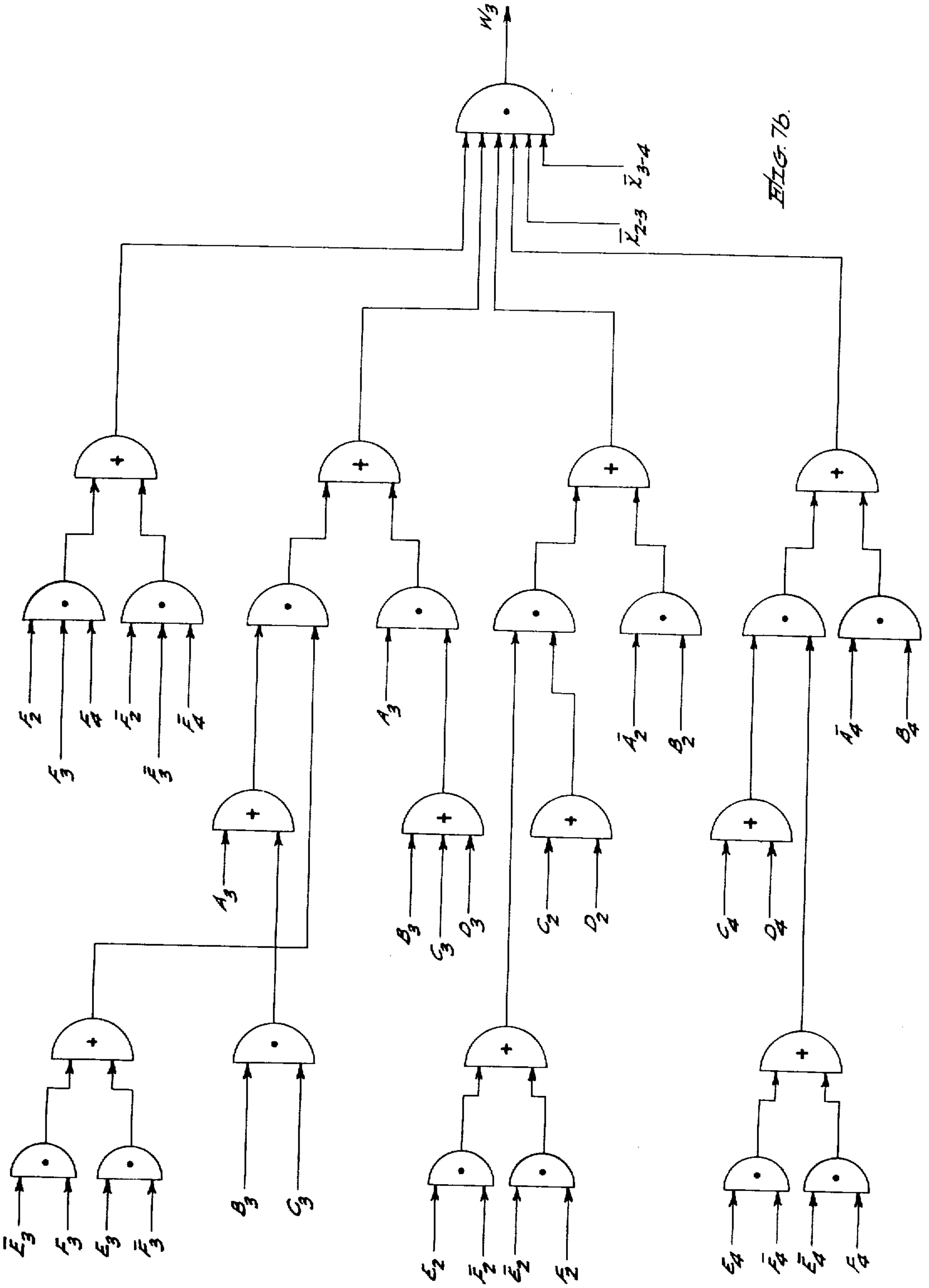
Figure 7C:
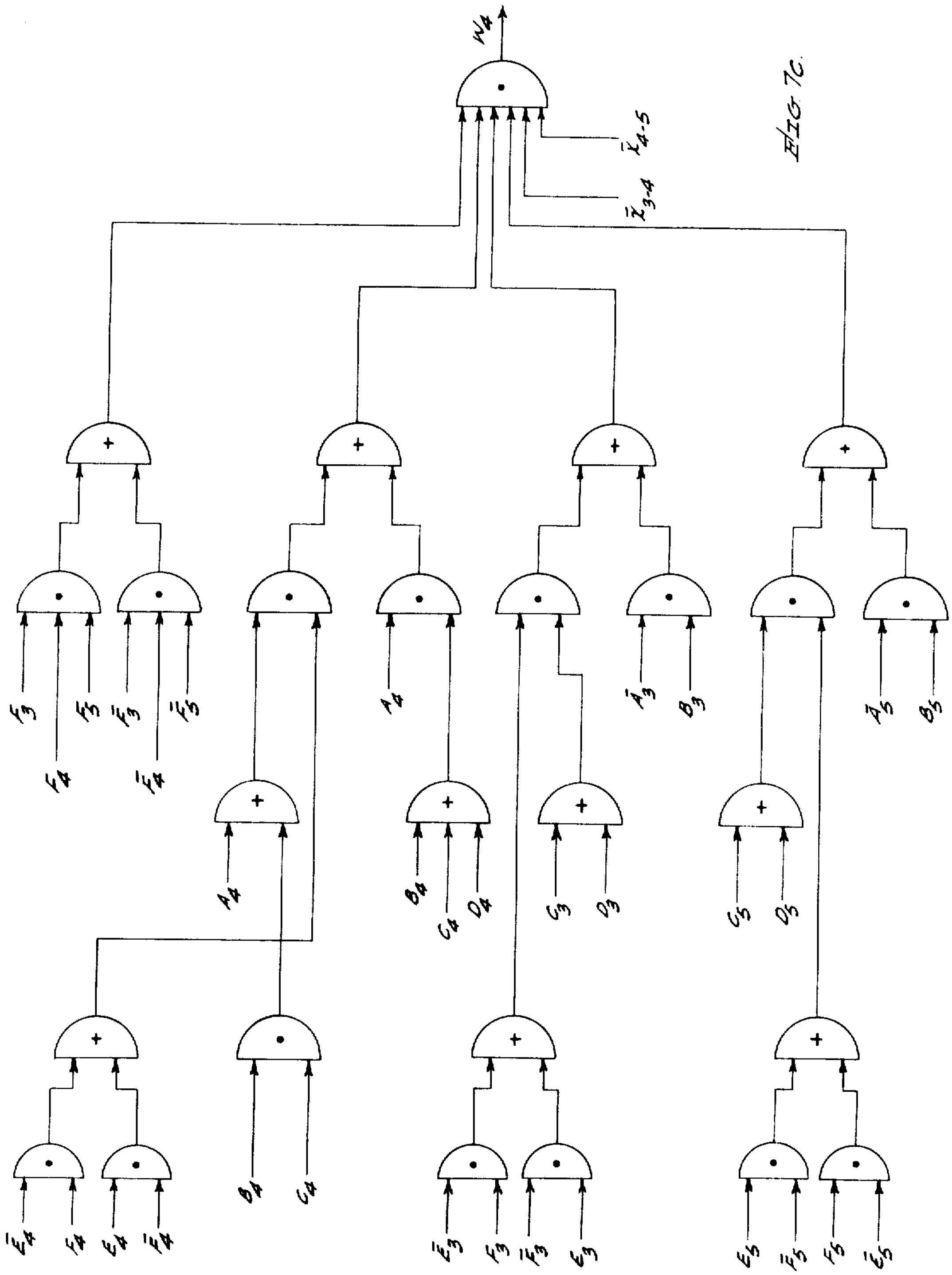
Figure 7D:
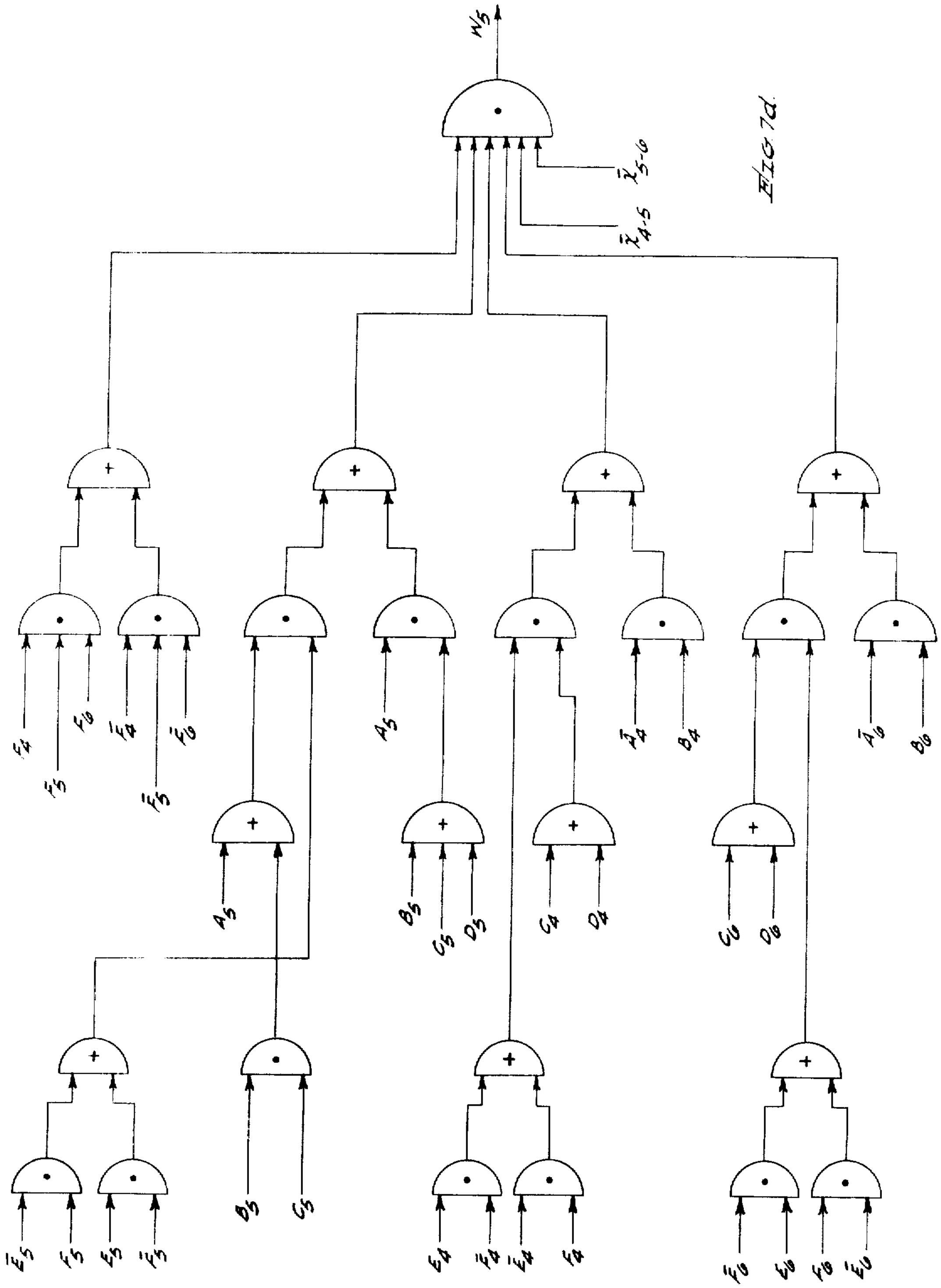
Figure 70:
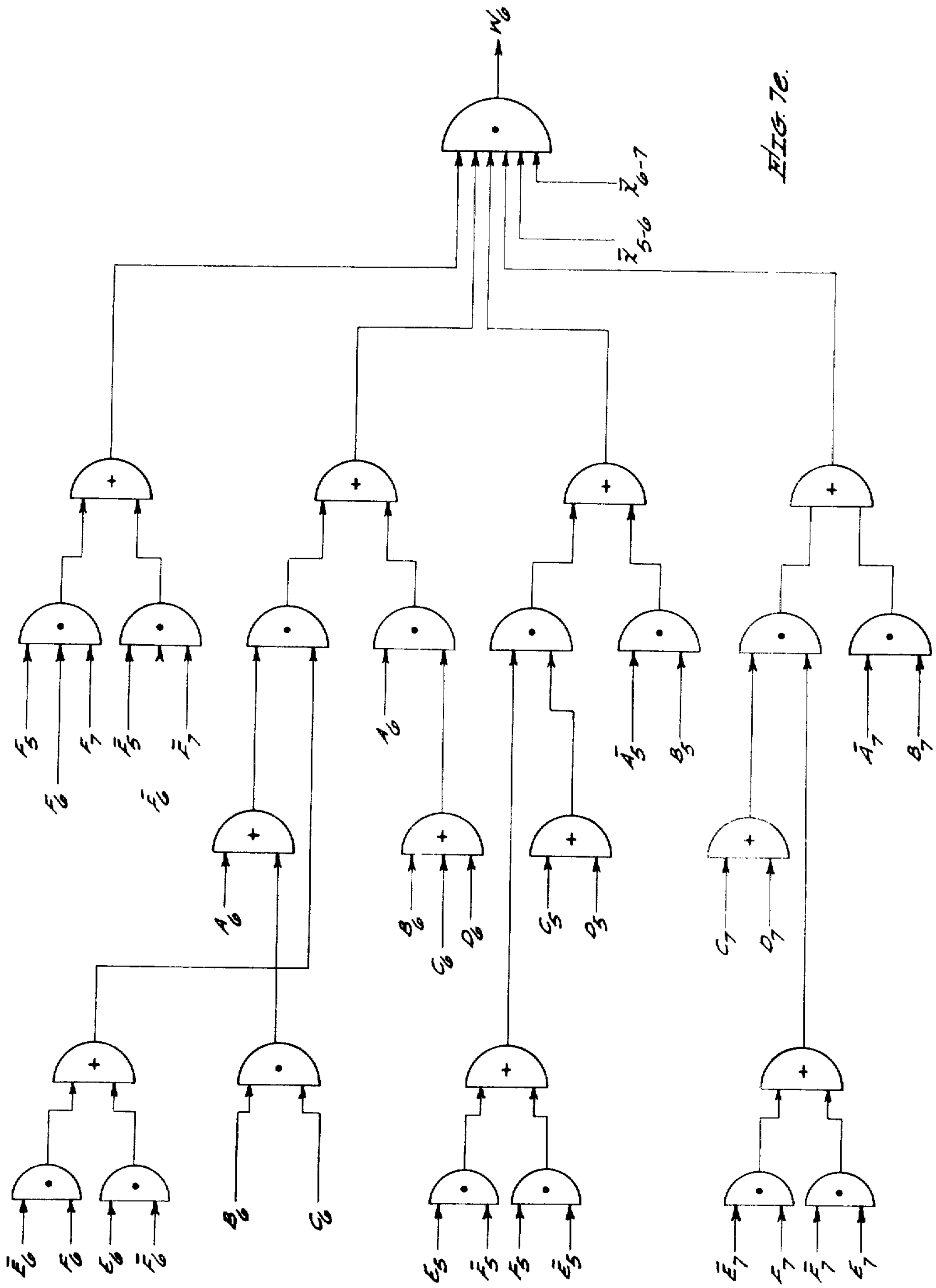

FIGURES 3A, 3B, 3C, and 3D illustrate a reversible counter used with this invention and its associated enabling logic inputs;

FIGURE 4 is a schematic logic diagram illustrating the threshold detection logic;

FIGURES 5A through 5G are logic diagrams illustrating single beam detection logic;

FIGURE 6 is a logic diagram illustrating two-beam detection logic; and

FIGURES 7A through 7E are logic diagrams illustrating three-beam detection logic.

In determining the hits-per-return ratio of a single range bin the scan-to-scan correlation or the Markov process of probabilities is applied. This process is best explained in the publication entitled "Introduction to Radar Systems" by Merril I. Skolnick, published by McGraw-Hill, 1962, p. 55.

The actual count procedure followed in this embodiment follows the above process and allows a hit to cause a binary counter to be advanced two counts while a miss causes the counter to count down one count. A false alarm rate can thus be generated using this procedure.

The noise false alarm rate on an individual hit basis was selected. The probability of an incoming video signal being a hit being 0.1 or 10% and the probability of it being a miss being 0.9 or 90%. With this criteria and assuming the counter was in a state X then there is a probability of 0.1 to advance to $(X+2)$ and a probability of 0.9 to decrease to $(X-1)$ the next count signal. The following table may be used as an explanation of the above situation:

TABLE I

| Initial State of Counter | Next State of the Counter | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | |
| 0 | .9 | 0 | .1 | 0 | 0 | 0 | 0 | 0 | 0 | 0 | 0 | 0 | 0 | 0 | |
| 1 | .9 | 0 | 0 | .1 | 0 | 0 | 0 | 0 | 0 | 0 | 0 | 0 | 0 | 0 | |
| 2 | 0 | .9 | 0 | 0 | .1 | 0 | 0 | 0 | 0 | 0 | 0 | 0 | 0 | 0 | |
| 3 | 0 | 0 | .9 | 0 | 0 | .1 | 0 | 0 | 0 | 0 | 0 | 0 | 0 | 0 | |
| 4 | 0 | 0 | 0 | .9 | 0 | 0 | .1 | 0 | 0 | 0 | 0 | 0 | 0 | 0 | |
| 5 | 0 | 0 | 0 | 0 | .9 | 0 | 0 | .1 | 0 | 0 | 0 | 0 | 0 | 0 | |
| 6 | 0 | 0 | 0 | 0 | 0 | .9 | 0 | 0 | .1 | 0 | 0 | 0 | 0 | 0 | Equals A |
| 7 | 0 | 0 | 0 | 0 | 0 | 0 | .9 | 0 | 0 | .1 | 0 | 0 | 0 | 0 | |
| 8 | 0 | 0 | 0 | 0 | 0 | 0 | 0 | .9 | 0 | 0 | .1 | 0 | 0 | 0 | |
| 9 | 0 | 0 | 0 | 0 | 0 | 0 | 0 | 0 | .9 | 0 | 0 | .1 | 0 | 0 | |
| 10 | 0 | 0 | 0 | 0 | 0 | 0 | 0 | 0 | 0 | .9 | 0 | 0 | .1 | 0 | |
| 11 | 0 | 0 | 0 | 0 | 0 | 0 | 0 | 0 | 0 | 0 | .9 | 0 | 0 | .1 | |
| 12 | 0 | 0 | 0 | 0 | 0 | 0 | 0 | 0 | 0 | 0 | 0 | .9 | 0 | .1 | |
| 13 | 1. | 0 | 0 | 0 | 0 | 0 | 0 | 0 | 0 | 0 | 0 | 0 | 0 | 0 | |

Each row of the table indicates the initial state of the counter. The counter can only advance to its next state with the probability indicated. For example, with the initial count of three maintained in the counter, it can advance to a five with the probability of 0.1 or it can decrease to 2 with the probability of 0.9 and it has a probability of 0 going to any other state. Since each of the rows in the table sum to 1, it can be treated as a probability matrix A. The usefulness of the matrix is indicated in the following example. If a new matrix B is desired which represents the initial state vs. the state two counts later instead of one count later, the following formula is used:

$$B=A^2$$

To compute the new matrix if C represents the state of the counter N states later then $$C=A^N$$

When N becomes large enough it has been found that $$A^N=A^{N+K}$$

where K is any positive integer. This final matrix was called the stable value of the matrix. In this particular matrix the entries in each column are equal to each other, and the sum of the entries in each row are equal to 1.

The above indicates that regardless of the state which the counter started, the probability of it being at a count of three for instance is given by an entry in col. 3 of Table I, but because entries within this column are equal or each row is identical, the probabilities of the count being a false alarm is computed as follows in Table II:

TABLE II

| Count: | Probability |
|---|---|
| 0 | $7.78\times10^{-1}$ |
| 1 | $8.64\times10^{-2}$ |
| 2 | $9.60\times10^{-2}$ |
| 3 | $2.027\times10^{-2}$ |
| 4 | $1.29\times10^{-2}$ |
| 5 | $3.69\times10^{-3}$ |
| 6 | $1.84\times10^{-3}$ |
| 7 | $6.12\times10^{-4}$ |
| 8 | $2.71\times10^{-4}$ |
| 9 | $9.63\times10^{-5}$ |
| 10 | $3.89\times10^{-5}$ |
| 11 | $1.31\times10^{-5}$ |
| 12 | $3.89\times10^{-6}$ |
| 13 | $1.7\times10^{-6}$ |

Figure 1:
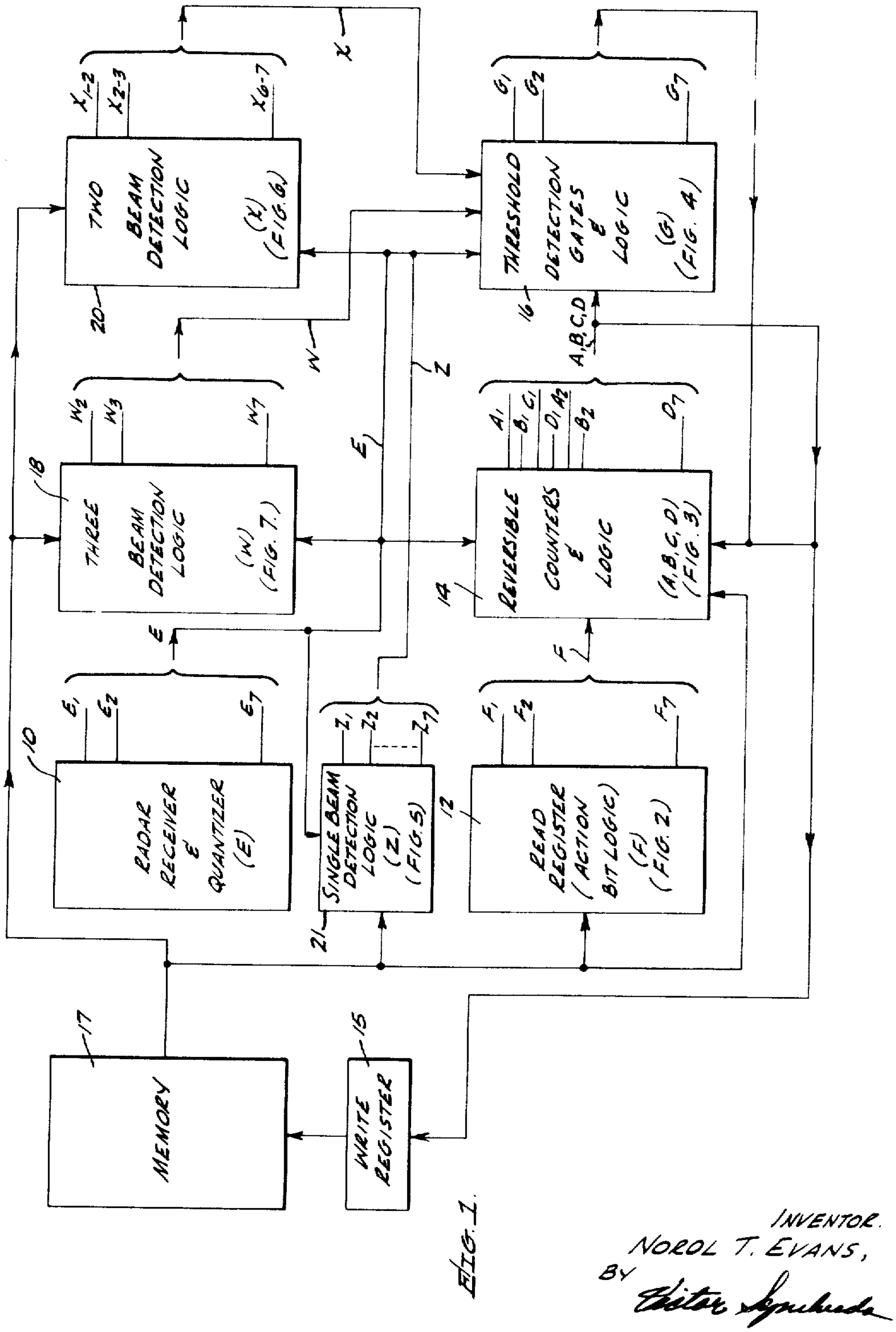
FIGURE 1 is a simplified block diagram illustrating a preferred embodiment of this invention when used for processing radar video returns.

Turning now to a detailed description of one preferred embodiment of this invention, there is shown in FIGURE 1 a plurality of radar receivers 10 which receive input data from a plurality of input channels which may be quantized video signals from a radar system (not shown). Each video signal is quantized within radar receivers and quantizers 10 and presents digital data on a plurality of output channels designated $E_1$ through $E_7$ corresponding to each individual receiver. Seven radar video return beams have been shown here only as an example and it must be understood that more beams may be processed by this invention using increased equipment for each beam.

Each receiver 10 receives a video signal from stacked radar beams in real time and in this particular embodiment seven receivers are used for seven particular beams. The $E_1$–$E_7$ outputs of these receivers and quantizers 10 are presented to the reversible counters and logic 14.

The read register 12 comprises a plurality of flip-flops $F_1$ through $F_7$ which contains the logic for indicating that if true a target has been determined and is triggered by incoming G terms later to be explained. Read register 12 is coupled to data channels of a data storage device such as a core memory device 17 which store data in address locations corresponding to the range bin of the video returns. The data is continually recirculated from the memory 17 through the read register 12 through logic to be explained, updated by the incoming $E_1$–$E_7$ terms and stored back into the memory 17 through write register 15 until a target has been ascertained. Read register 12 provides a plurality of outputs $F_1$–$F_7$ and each of these outputs is presented to the reversible counters and logic or counter logic 14 through output channels generally designated F. Although not shown in FIG. 1 but which will be described later, each of the outputs $F_1$–$F_7$ are also presented to the three beam detection logic 18, the two beam detection logic 20, and the single beam detection logic 21. As will become apparent an F term indicates a target has been determined and an $\overline{F}$ indicates a target has not been determined. The counter logic 14 comprises a plurality of counters one through seven which corresponds to the terms $F_1$–$F_7$ and also responds to the video signals E emanating from the beam receivers and quantizers 10. The output signals from each counter are generally designated A, B, C and D. Where A is the most significant digit of the read register 12, B is the third least significant digit of the read register 12. C is the second least significant digit of read register 12 and D is the least significant digit of read register 12. When taking all digit terms into consideration, they are indicative of some binary number indicative of the value of the range bins during any specific sample time. Each of these counters operate by their logic, as will be explained later, to cause their associated counters to update the value of the data in a corresponding memory channel by causing the contents thereof to count up two increments for each binary one and count down one increment for each binary zero of the video signals E. The output of the counter logic 14 is coupled to threshold detection gates and logic or threshold detection logic 16 by the lead line generally designated A, B, C, D. The threshold detection logic 16 comprises a plurality of gates $G_1$–$G_7$ and each gate is enabled when a target is indicated by the count contained in the associated counters 14 and as updated by incoming E terms. The output of the $G_1$ through $G_7$ gates is presented directly as enabling terms to the write register 15.

Also coupled as inputs to threshold detection logic 16 are the outputs $W_2$ through $W_6$ from a three-beam detection logic 18 by the lead line generally designated W. The three-beam detection logic 18 is enabled by the output terms A, B, C, D from memory 17 which indicates the state of the data at corresponding range bins, the F terms (see FIGS. 7A–7E) from read register 12, and also by the video signals E. Also coupled as enabling inputs to threshold detection gates and logic 16 are the outputs $X_{1-2}$, $X_{2-3}$, $X_{3-4}$, $X_{4-5}$, $X_{5-6}$, and $X_{6-7}$ from two-beam detection logic (X) 20 which is also enabled by the data stored in memory 17 during specific range bins, the F terms (see FIG. 6) from read register 12, and by the video input signals E. And finally, single beam detection logic 21, which is enabled by the data stored in memory 17 during specific range bins, the F terms (see FIGS. 5A–5G) from read register 12, and the video input signals E, provides enabling signals $Z_1$ through $Z_7$ to the threshold logic 16 for determining whether a target has been declared on a single beam. The single beam detection logic 21 is enabled by the video input signals E.

In operation the video signals are presented to counters and logic 14. Each counter as previously indicated will cause the contents of the data being recirculated during a specific corresponding range bin address to increase in value two increments if a hit or a one is determined, but will cause the contents thereof to decrease in value one increment if a miss or a zero has been determined. When the data in the memory 17 during a specific input addressed range bin reaches a count of 13, in the counter and logic 14 by updating signals from receivers 10, it has been determined by the aforementioned probability table that a target has been indicated and the appropriate gate G will be enabled by the threshold detection logic 16. This gate G then will cause the appropriate flip-flop of write register 15 to be enabled and store a target in the memory while resetting the counter to zero.

Further, if two adjacent counters each reach a count of six or more the probability of a hit is also indicated and the appropriate logic gate G will be enabled and this is carried out by two-beam detection logic (X) 20. If three counters indicate that a center counter has a count of eight contained therein and adjacent counters on either side thereof have a count of three or more the probability of a hit is determined and the appropriate threshold gate will register a hit to the write register 15 which will be stored in memory 17.

When the contents of a single storage address in memory 17 stores a target an F is stored and the associated counter is reset to zero. The leading edge of the target is now declared. The next step is to detect when the target has diminished or the trailing edge has been declared. This is accomplished in the same manner with the exception that the counter logic 14 increase the contents (now set to zero by a $G_1$) to increase two increments on a miss or a zero and decrease one increment on a hit or one from the radar receiver and quantizer 10.

Figure 2:
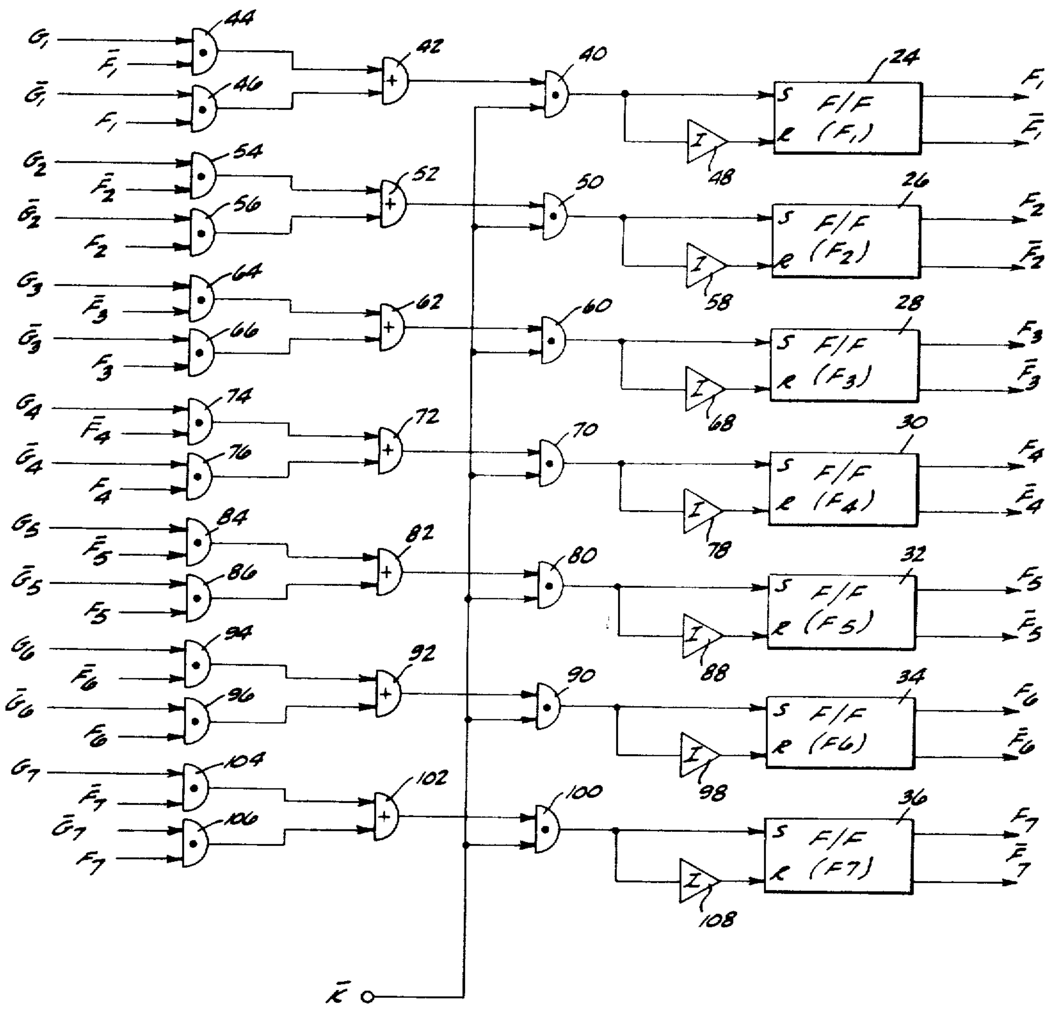
FIGURE 2 is a logic diagram illustrating a read register and the logic gates used therewith.

The reversible counter logic 14 comprising binary counters 1 through 7 and each counter has associated therewith an action bit in the form of a plurality of flip-flops $F_1$ through $F_7$ as shown in FIGURE 2. These flip-flops are of the set-reset type and wherein flip-flop 24 is enabled by the following logic equation as stated in Boolean notations:

$$\text{Set } F_1=(G_1\overline{F}_1+\overline{G}_1F_1)\,\overline{K}$$
$$\text{Reset } F_1=\overline{\text{Set }F_1}$$

Flip-flop 26 is set and reset by the following:

$$\text{Set } F_2=(G_2\overline{F}_2+\overline{G}_2F_2)\,\overline{K}$$
$$\text{Reset } F_2=\overline{\text{Set }F_2}$$

Flip-flop 28 is set and reset by the following:

$$\text{Set } F_3=(G_3\overline{F}_3+\overline{G}_3F_3)\,\overline{K}$$
$$\text{Reset } F_3=\overline{\text{Set }F_3}$$

Flip-flop 30 is set and reset by the following:

$$\text{Set } F_4=(G_4\overline{F}_4+\overline{G}_4F_4)\overline{K}$$
$$\text{Reset } F_4=\overline{\text{Set }F_4}$$

Flip-flop 32 is set and reset by the following:

$$\text{Set } F_5=(G_5\overline{F}_5+\overline{G}_5F_5)\overline{K}$$
$$\text{Reset } F_5=\overline{\text{Set }F_5}$$

Flip-flop 34 is set and reset by the following:

$$\text{Set } F_6=(G_6\overline{F}_6+\overline{G}_6F_6)\overline{K}$$
$$\text{Reset } F_6=\overline{\text{Set }F_6}$$

Flip-flop 36 is set and reset by the following:

$$\text{Set } F_7=(G_7\overline{F}_7+\overline{G}_7F_7)\overline{K}$$
$$\text{Reset } F_7=\overline{\text{Set }F_7}$$

Where F terms are read from memory 17 indicating a valid target F or invalid target $\overline{F}$ has been previously stored and G is an enabling term from the threshold logic 16 indicating a G as a target has been declared by the previous detection signals W, X or Z and will be stored as F while $\overline{G}$ indicates no target declared and is stored as $\overline{F}$.

FIGURE 2 shows a schematic diagram for implementing the above equations wherein the set input of a flip-flop 24 is coupled to an AND gate 40 which is enabled by a $\overline{K}$, a clear and reset memory position button (not shown). AND gate 40 is also enabled by the output of OR gate 42. OR gate 42 is enabled by the output of a pair of AND gates 44 and 46. AND gate 44 being enabled by a $G_1$ from threshold detection logic 16 and a $\overline{F}_1$, $\overline{F}_1$ term indicating that the $\overline{F}_1$ action bit flip-flop is false, and that a target has not been previously declared and a $G_1$ indicating that a target has been declared during this E beam sweep. AND gate 46 is enabled by a $\overline{G}_1$ and a $F_1$, indicating that a target has already been stored, thus resetting counter 14 to zero as will be explained. The output of AND gate 40 is presented to an inverter 48 which is presented to the reset input of flip-flop 44.

Flip-flop 26 is set by the output of AND gate 50 which in turn is enabled by a $\overline{K}$ and the output of OR gate 52. OR gate 52 is enabled by the outputs from a pair of AND gates 54 and 56. AND gate 54 is enabled by $G_2$ and a $\overline{F}_2$. AND gate 56 is enabled by a $\overline{G}_2$ and a $F_2$. The output of AND gate 50 is also coupled to the input of an inverter 58, the output therefrom being coupled to the reset input of flip-flop 26.

Flip-flop 28 is set by the output of AND gate 60 which in turn is enabled by $\overline{K}$ and the output of OR gate 62. OR gate 62 is enabled by the outputs from a pair of AND gates 64 and 66. AND gate 64 is enabled by $G_3$ and $\overline{F}_3$. AND gate 66 is enabled by a $\overline{G}_3$ and $F_3$. The output of AND gate 60 is also coupled to an input of an inverter 68 and the output therefrom being coupled to the reset input of flip-flop 28.

Flip-flop 30 is set by the output of AND gate 70 which, in turn, is enabled by $\overline{K}$ and the output of OR gate 72. OR gate 72 is enabled by the outputs from a pair of AND gates 74 and 76. AND gate 74 is enabled by a $G_4$ and a $\overline{F}_4$. AND gate 76 is enabled by a $\overline{G}_4$ and a $F_4$. The output of AND gate 70 is coupled to the input of an inverter 78 and the output therefrom being coupled to the reset input of flip-flop 30.

Flip-flop 32 is set by the output of AND gate 80 which in turn is enabled by $\overline{K}$ and the output from OR gate 82. OR gate 82 is enabled by the outputs of a pair of AND gates 84 and 86. AND gate 84 is enabled by a $G_5$ and a $\overline{F}_5$. AND gate 86 is enabled by a $\overline{G}_5$ and a $F_5$. The output of AND gate 80 is also coupled to the input of an inverter 88 the output therefrom being coupled to the reset input of flip-flop 32.

Flip-flop 34 is set by the output of AND gate 90 which, in turn, is enabled by a $\overline{K}$ and the output of OR gate 92. OR gate 92 is enabled by the outputs from a pair of AND gates 94 and 96. AND gate 94 is enabled by a $G_6$ and a $\overline{F}_6$. AND gate 96 is enabled by a $\overline{G}_6$ and a $F_6$. The output of AND gate 90 is also coupled to the input of an inverter 98, the output therefrom being coupled to the reset input of flip-flop 34.

Finally, flip-flop 36 is set by the output of OR gate 100, which, in turn, is enabled by a $\overline{K}$ and the output of AND gate 102. OR gate 102 is enabled by the outputs from a pair of AND gates 104 and 106. AND gate 104 is enabled by a $G_7$ and a $\overline{F}_7$. AND gate 106 is enabled by a $\overline{G}_7$ and a $F_7$. The ouput of AND gate 100 is also coupled to the input of an inverter 108, the output therefrom being coupled to the reset input of flip-flop 36.

In the processing of the incoming video returns during an individual range bin a reversible binary counting means 14 in the form of a plurality of four-bit binary counters is provided for each incoming E beam. Each counter comprises four flip-flops A through D, each of which provides a 16-bit binary count. FIGURES 3A through 3D illustrate only one counter and its associated logic and it is to be understood that a counter must be provided for each radar beam substantially as this one shown and described. The contents of a specific address location of memory 17 is loaded into the counters 14 and is then updated by incoming hits or misses from the radar receiver 10 in the form of E terms.

Figure 3A:
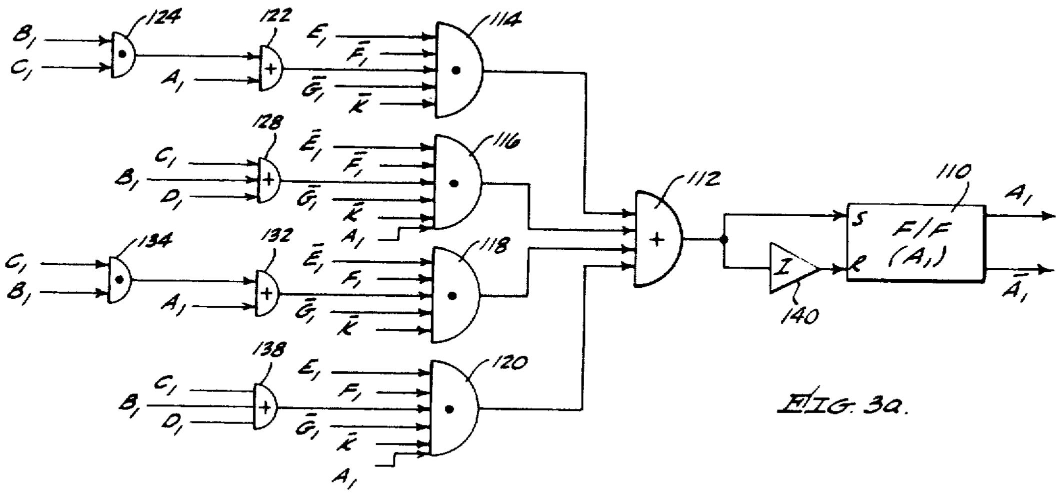

Each flip-flop in the counter is set and reset by reversible counting logic as shown in FIGURES 3A through 3D. Flip-flop 110 as shown in FIGURE 3A is set and reset by the following Boolean equation:

$$\text{Set } A_1=E_1\overline{F}_1\overline{G}_1\overline{K}_1(A_1+B_1C_1)+A_1\overline{E}_1\overline{F}_1\overline{G}_1(B_1+C_1+D_1)$$
$$+\overline{E}_1F_1\overline{G}_1\overline{K}(A_1+B_1C_1)+A_1E_1F_1\overline{G}_1\overline{K}(B_1+C_1+D_1)$$
$$\text{Reset } A_1=\overline{\text{Set}}\ \overline{A}_1$$

FIGURE 3A illustrates a logic block diagram for the implementation of the above equation wherein the set input of flip-flop 110 is enabled by the output of OR gate 112. OR gate 112 in turn is enabled by the outputs of AND gates 114, 116, 118 or 120. AND gate 114 is enabled by $\overline{K}$, an incoming video term $E_1$, the term $\overline{F}_1$ from read register 12, a $\overline{G}_1$ term indicating that a hit has not been detected by the threshold detection logic 16. AND gate 114 is also enabled by the output from OR gate 122. OR gate 122 is enabled by data read directly from the memory 17. An OR gate 122 is enabled by the term $A_1$, which indicates that a count of 8 or more is contained in the memory or by the output from AND gate 124 which indicates that the word in the memory location is either 6 or 7 because these terms will have a $B_1$ true and a $C_1$ true. Thus, if the $A_1$ is 8 or more the MSD flip-flop 110 will be enabled or if the $\overline{G}_1$ is present indicating that a target has not been determined and an incoming video $E_1$ is present and a 6, 7 or 8 is present the flip-flop 110 is enabled. This is because if a 2 is added to 6 it becomes 8 and therefore the MSD $A_1$ should be true. The same is true for 7 and 8 which become 9 or 10 by virtue of the $E_1$.

AND gate 118 is enabled by the terms $\overline{E}_1$, $F_1$, $\overline{G}_1$, $\overline{K}$ and the output of OR gate 132. OR gate 132 is enabled by the term $A_1$ which indicates that the contents of that particular memory location is 8 or above. OR gate 132 is also enabled by the output of AND gate 134 which is enabled by the terms $B_1$ $C_1$ which is 6 or 7 and therefore an incoming video $E_1$ will enable flip-flop 110.

Next it becomes necessary to cause the logic to declare a trailing edge or that the target has decreased. This is accomplished, as mentioned, by causing the contents of the memory at a particular addressed bin location to increase two increments on incoming $\overline{E}_1$ in the presence of an $F_1$ and to decrease one increment by an $E_1$ in the presence of an $F_1$. Note that the equations are identical as inputs to AND gates 118 and 120 when compared to the inputs to AND gates 114 and 116 respectively with the exception of the E and F terms.

AND gate 116 is enabled by an $\overline{E}_1$, an $\overline{F}_1$ indicating that the read register 12 does not indicate a target stored and the radar receiver 10 detects a miss, an $\overline{G}_1$ indicating a threshold has not been detected, the output of OR gate 128, a $\overline{K}$, and an $A_1$ from the memory 17. Therefore the object is to cause the counter to count up 2 increments on $\overline{E}_1$ and down 1 increment on $E_1$. AND gate 128 is enabled by a $C_1$, a $D_1$ or a $B_1$ which indicate that $A_1$ must be true when a 1 count is added to increments in which $C_1$, $D_1$ or $B_1$ is true as well as if an $A_1$ applied to AND gate 116 indicates that the state of the word stored in that particular memory location is 8 or more.

AND gate 120 is enabled by the terms $E_1$, $F_1$, $\overline{G}_1$, $\overline{K}$, $A_1$ and the output from OR gate 138 which, in turn, is enabled by the terms $C_1$, $D_1$ or $B_1$.

The output of OR gate 112 is also applied to an inverter 140 the output of which is applied to the reset input of flip-flop 110.

The $B_1$ flip-flop 142 is enabled by the following equation:

$$\text{Set } B_1=E_1\overline{F}_1\overline{G}_1(\overline{A}_1\overline{B}_1C_1+\overline{A}_1B_1\overline{C}_1+A_1\overline{B}_1C_1\overline{D}_1)\overline{K}$$
$$+\overline{E}_1\overline{F}_1\overline{G}_1[A_1\overline{B}_1\overline{C}_1\overline{D}_1+\overline{A}_1B_1(C_1+D_1)]\overline{K}$$
$$+\overline{E}_1F_1\overline{G}_1(\overline{A}_1\overline{B}_1C_1+\overline{A}_1B_1\overline{C}_1+A_1\overline{B}_1C_1\overline{D}_1)\overline{K}$$
$$+E_1F_1\overline{G}_1[A_1\overline{B}_1\overline{C}_1\overline{D}_1+\overline{A}_1B_1(C_1+D_1)]\overline{K}$$
$$\text{Reset } B_1=\overline{\text{Set}}\ \overline{B}_1$$

Figure 3C:
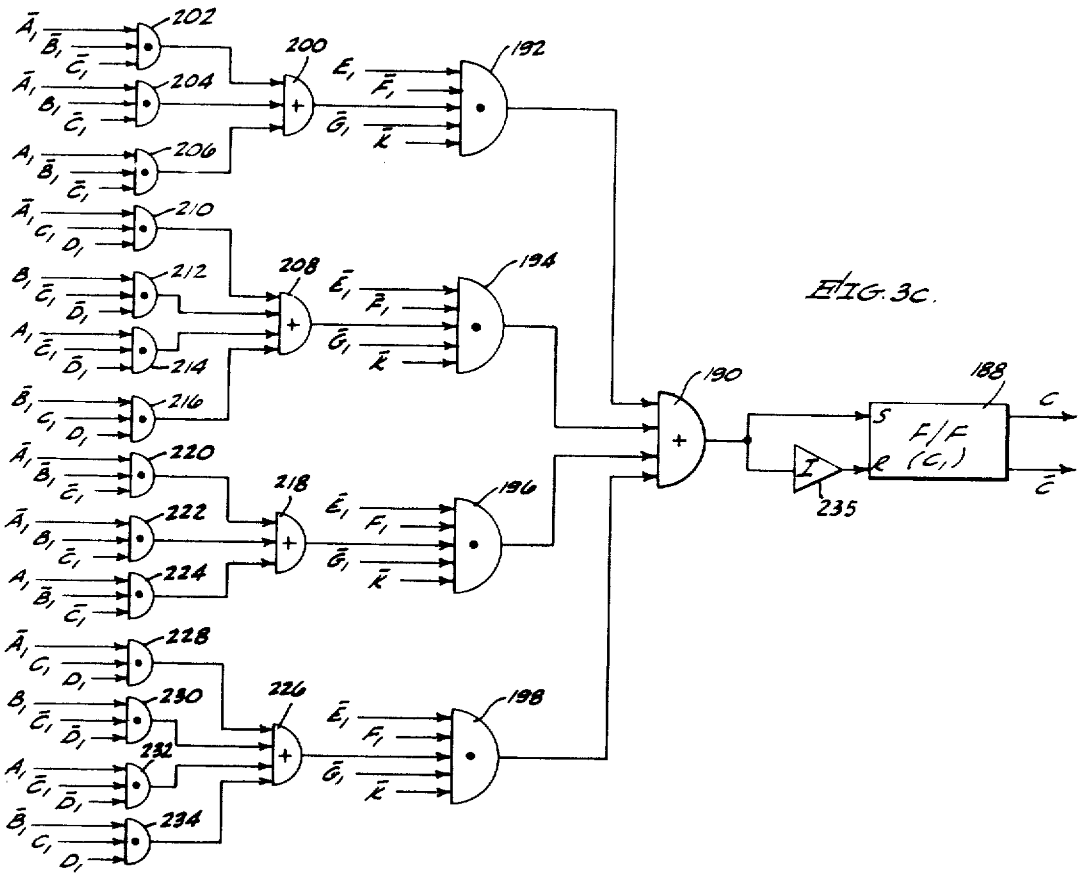
Figure 3B:
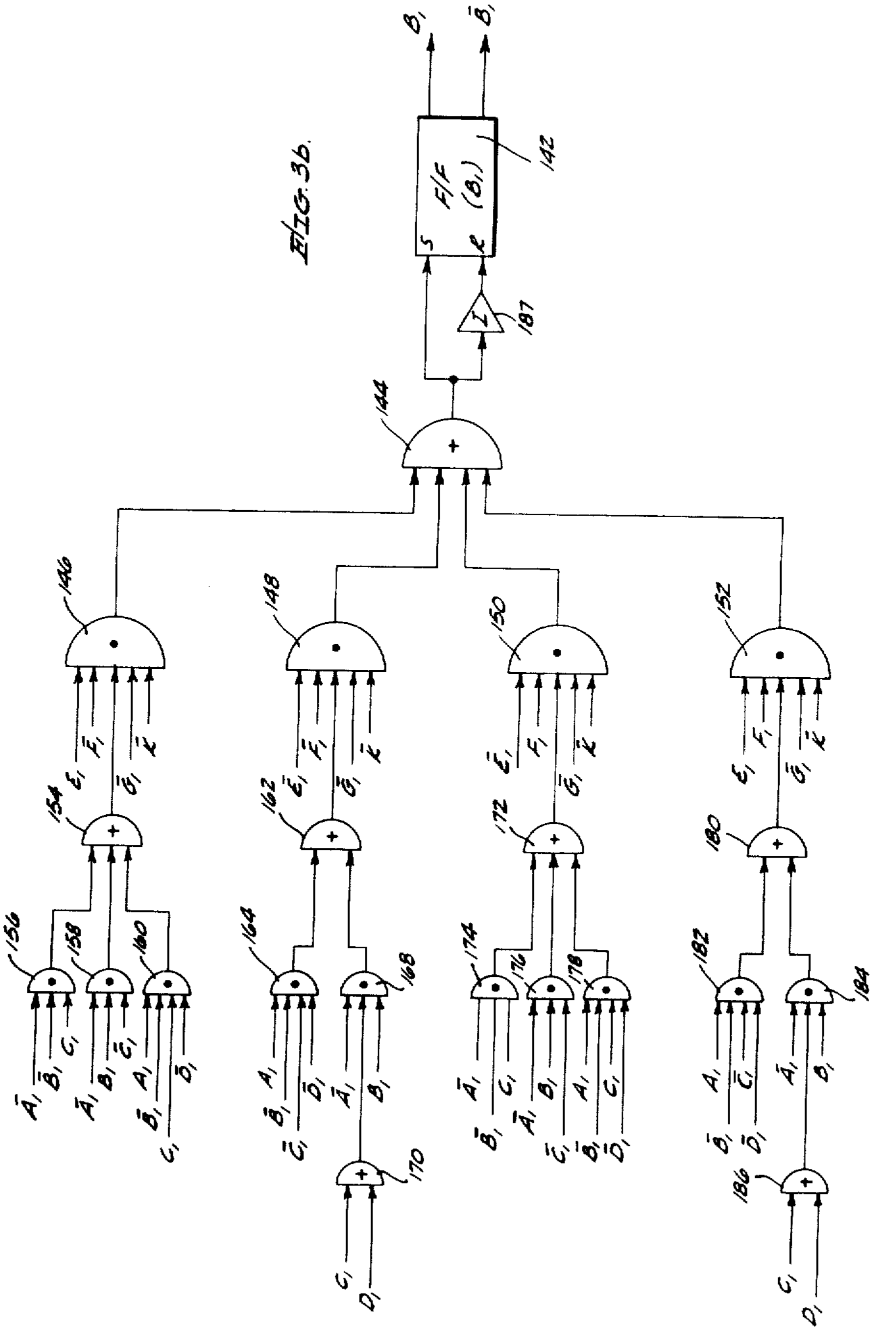

FIGURE 3B illustrates a logic block diagram for implementing the above equation wherein the set input of flip-flop 142 is enabled by the output of OR gate 144. OR gate 144 in turn is enabled by the output of AND gates 146, 148, 150 and 152. AND gate 146 is enabled by the incoming video return $E_1$, the $\overline{F}_1$, indicating no target stored, from read register 12, a $\overline{G}_1$ term indicating the threshold had not been detected in this range bin, at a particular address, by the threshold detection logic 16 and a $\overline{K}$. Also providing an enabling term to AND gate 146 is the output from OR gate 154. OR gate 154 is enabled by the output of AND gate 156, 158 or 160 wherein these AND gates are enabled by the outputs of memory 17 indicating the present state of the range bin before the incoming video returns enabling AND gate 146, wherein AND gate 156 is enabled when $\overline{A}_1$, $\overline{B}_1$ and $C_1$ is stored in the memory 17. This indicates that a 2 or 3 is presently stored in the memory and that they will be increased to 4 or 5 by an incoming $E_1$. Flip-flop 142 must be set true because the numbers 6 or 7 must have a B true when expressed in binary terms. AND gate 158 is enabled by the terms $\overline{A}_1$, $B_1$ and $\overline{C}_1$ which indicates that a 4 or 5 is presently stored in the memory and that they will be increased to 6 or 7 by an incoming $E_1$, and set flip-flop 142. Finally, the last enabling term to OR gate 154 comes from the AND gate 160 which is enabled by $A_1$, $\overline{B}_1$, $C_1$ and $D_1$ which indicates that the number presently stored in memory 17 is 10 and the same rules apply.

AND gate 148 is enabled by an $\overline{E}_1$, a $\overline{F}_1$, a $\overline{G}_1$ and a $\overline{K}$. It is also enabled by the output from OR gate 162. OR gate 162 is in turn enabled by the outputs of AND gate 164 or AND gate 168. AND gate 164 is enabled by the term $A_1$, $\overline{B}_1$, $\overline{C}_1$, $\overline{D}_1$. This indicates that the 8 is stored in the memory for the particular range bin operated on and that should an $\overline{E}_1$ be applied the value must decrease 1 count to 7 in which B must be true. AND gate 168 is enabled by the output $\overline{A}_1$, $B_1$ and the output from OR gate 170 which is in turn enabled by the terms $C_1$, $D_1$ which indicates that the numbers 5, 6 or 7 is presently stored in the memory at that particular bin location.

AND gate 150 is enabled by the terms $\overline{E}_1$, $F_1$, $\overline{G}_1$, $\overline{K}$ and the output from OR gate 172. OR gate 172 is enabled by the output of AND gate 174, 176 or 178, wherein AND gate 174 is enabled by the term $\overline{A}_1$, $\overline{B}_1$, $C_1$ which indicates a No. 2 or 3 is stored. The output of AND gate 176 is enabled by an $\overline{A}_1$, a $B_1$, a $\overline{C}_1$ which indicates that the No. 4, 5 is stored in the memory and finally the output of AND gate 178 is enabled by the terms A, $\overline{B}_1$, $C_1$, and $\overline{D}_1$ indicating that the No. 10 is stored.

AND gate 152 is enabled by the terms $E_1$, $F_1$, $\overline{G}_1$, $\overline{K}$ and the output from OR gate 180. OR gate 180 is enabled by the outputs of AND gates 182, 184. AND gate 182 is enabled by the terms $A_1$, $\overline{B}_1$, $C_1$ and $\overline{D}_1$ which indicates that a No. 8 is stored. AND gate 184 is enabled by the terms $\overline{A}_1$ $B_1$ and the output from OR gate 186. OR gate 186 is enabled by the term $C_1$ or $D_1$ which indicates that AND gate 184 is enabled if any of the terms 5, 6 or 7 is stored in the memory.

The output of OR gate 144 is also applied to the input of an inverter 187 the output of which is applied as the reset input to flip-flop 142.

The $C_1$ flip-flop 188 is set and reset by the following equations:

$$\text{Set } C_1 = E_1\overline{F}_1\overline{G}_1(\overline{A}_1\overline{B}_1\overline{C}_1+\overline{A}_1B_1\overline{C}_1+A_1\overline{B}_1\overline{C}_1)\ \overline{K}$$
$$+\overline{E}_1\overline{F}_1\overline{G}_1(\overline{A}_1C_1D_1+B_1\overline{C}_1\overline{D}_1+A_1\overline{C}_1\overline{D}_1+\overline{B}_1C_1D_1)\ \overline{K}$$
$$+\overline{E}_1F_1\overline{G}_1(\overline{A}_1\overline{B}_1\overline{C}_1+\overline{A}_1B_1\overline{C}_1+A_1\overline{B}_1\overline{C}_1)\ \overline{K}$$
$$+E_1F_1\overline{G}_1(\overline{A}_1C_1D_1+B_1\overline{C}_1\overline{D}_1+A_1\overline{C}_1\overline{D}_1+\overline{B}_1C_1D_1)\ \overline{K}$$
$$\text{Reset } C_1 = \overline{\text{Set}}\ \overline{C}_1$$

FIGURE 3C illustrates a logic block diagram for the implementation of the above equation wherein the set input of flip-flop 188 is enabled by the output of OR gate 190 which is enabled by the outputs of AND gates 192, 194, 196 or 198. AND gate 192 is enabled by the $E_1$ term which indicates the incoming video hit is to be recorded, a $\overline{F}_1$ from the read threshold detection logic 16, a $\overline{G}_1$ from the read register 12 indicating that a threshold had not been detected by the state of the previous range bin. $\overline{K}$ indicating that a clear push button had not been enabled and the output from OR gate 200. OR gate 200 is enabled by the output from AND gates 202, 204 or 206 wherein AND gate 202 is enabled by the terms $\overline{A}_1$, $\overline{B}_1$, $\overline{C}_1$ which indicates that a No. 0 or 1 is stored in the memory. AND gate 204 is enabled by $\overline{A}_1$, $B_1$ or $\overline{C}_1$ indicating that a No. 4, 5 is stored. AND gate 206 is enabled by the term $\overline{A}_1$, $\overline{B}_1$ $\overline{C}_1$ indicating that the No. 8 or 9 is stored.

AND gate 194 is enabled by the terms $\overline{E}_1$, $\overline{F}_1$, $\overline{G}_1$ $\overline{K}$ and the output from OR gate 208. OR gate 208 is enabled by the outputs of AND gates 210, 212, 214 or 216. AND gate 210 is enabled by the terms $\overline{A}_1$, $C_1$, $D_1$ which indicates that the No. 3 or 7 is stored. AND gate 212 is enabled by the terms $B_1$, $\overline{C}_1$ and $\overline{D}_1$ indicating that a 4 or 12 is stored. AND gate 214 is enabled by the terms $A_1$, $\overline{C}_1$, $\overline{D}_1$ indicating that an 8 or 12 is stored. AND gate 216 is enabled by a $\overline{B}_1$, $C_1$ and $D_1$ indicating that a 3 is stored.

AND gate 196 is enabled by the terms $\overline{E}_1$, $F_1$, $\overline{G}_1$, and $\overline{K}$ and the output from OR gate 218. OR gate 218 is enabled by the outputs of an AND gates 220, 222 and 224. The AND gate 220 is enabled by the terms $\overline{A}$, $\overline{B}_1$, and $\overline{C}_1$ indicating that 1 or 0 is stored. AND gate 222 is enabled by the terms $\overline{A}_1$, $B_1$ and $\overline{C}_1$, indicating that a 4 or 5 is stored. AND gate 224 is enabled by $A_1$, $\overline{B}_1$, $\overline{C}_1$ indicating that an 8 or 9 is stored.

AND gate 198 is enabled by an $\overline{E}_1$, $\overline{F}_1$, $\overline{G}_1$, $\overline{K}$ and the output from OR gate 226. OR gate 226 is enabled by the output of AND gates 228, 230, 232 or 234. AND gate 228 is enabled by an $\overline{A}_1$, a $C_1$, $D_1$ indicating that a 3 or 7 is stored. AND gate 230 is enabled by a $B_1$, a $\overline{C}_1$, $\overline{D}_1$ indicating that a 4 or 12 is stored. AND gate 232 is enabled by an $A_1$, $\overline{C}_1$ and a $\overline{D}_1$ indicating that an 8 or 12 is stored. AND gate 234 is enabled by a $\overline{B}_1$, $C_1$ and $D_1$ indicating that a 3 or 11 is stored.

The output of OR gate 190 is also applied to an inverter 235, the output of which provides the reset input to flip-flop 188.

Figure 3D:
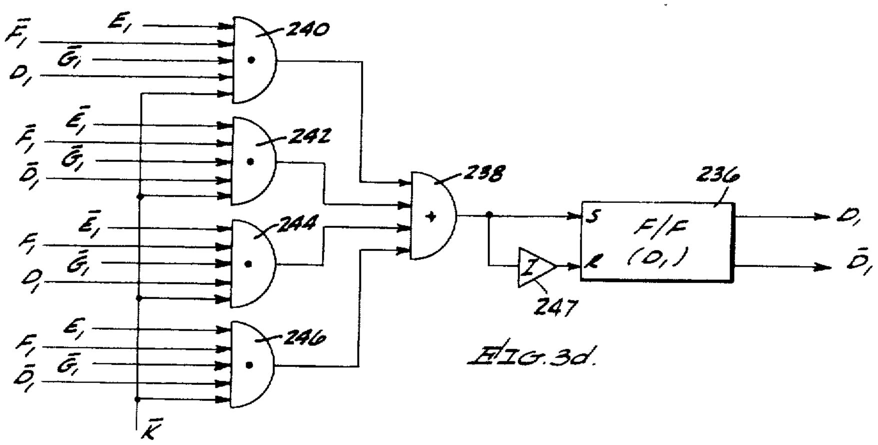
Figure 5A:
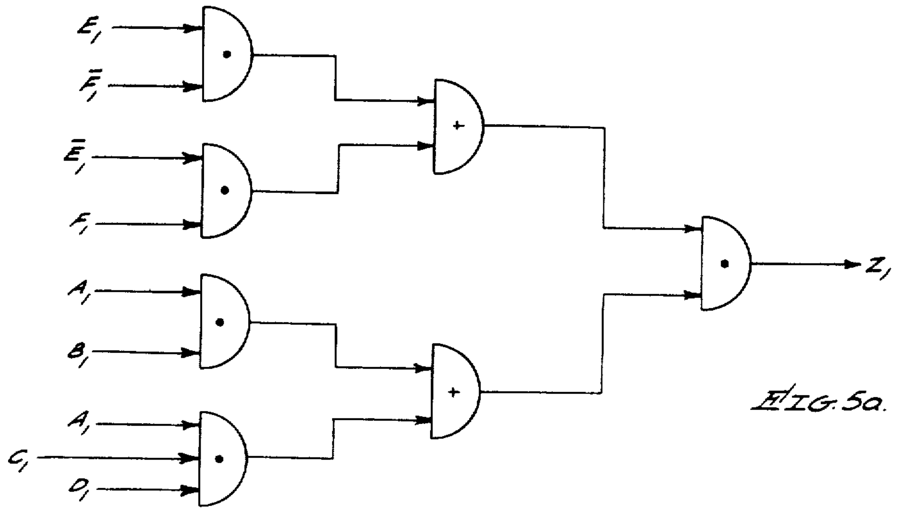
Figure 5B:
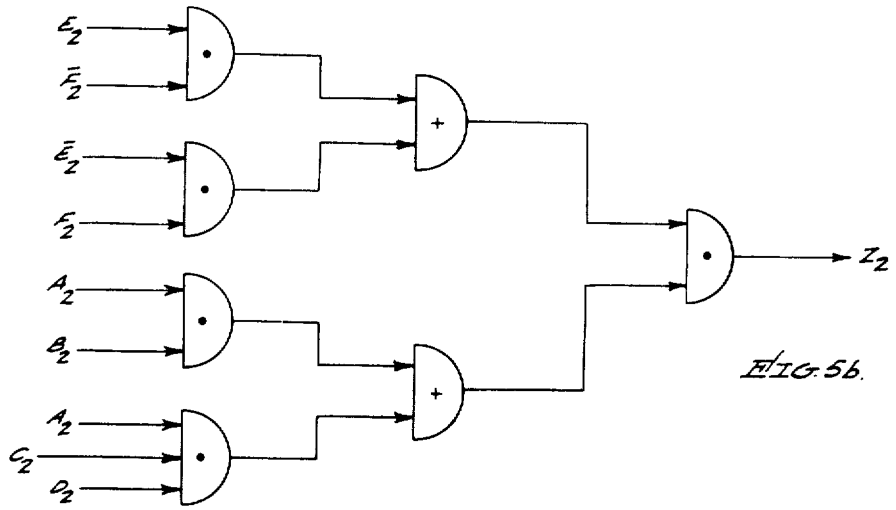
Figure 5C:
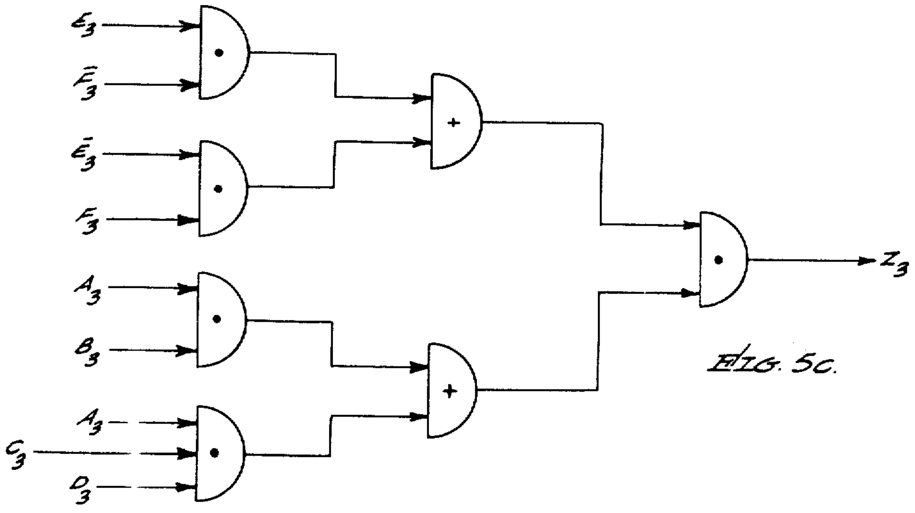
Figure 5D:
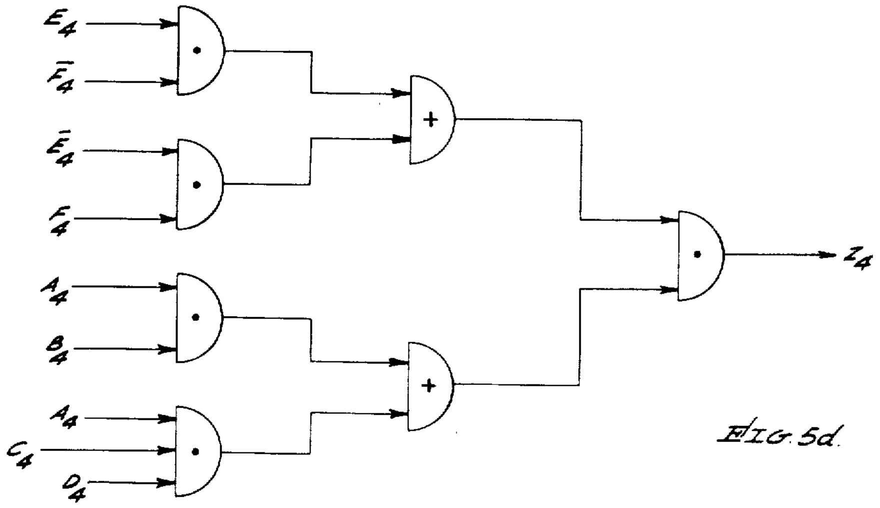
Figure 5E:
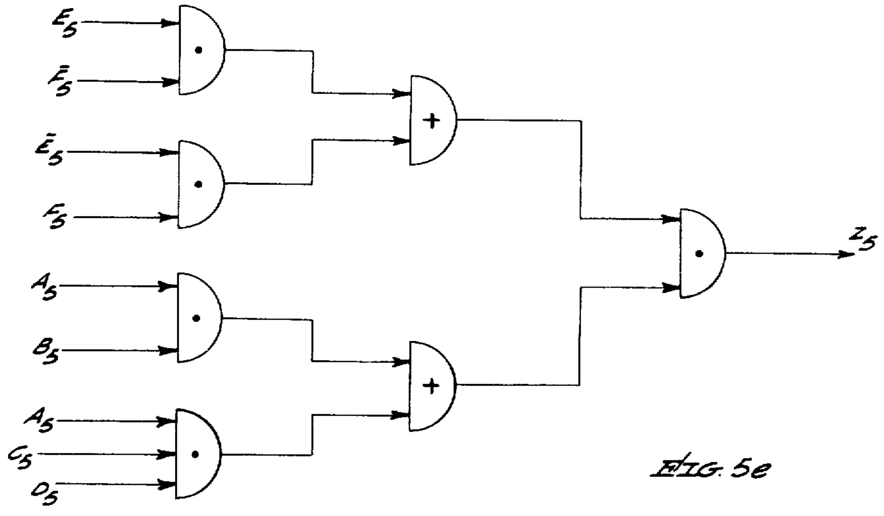
Figure 5F:
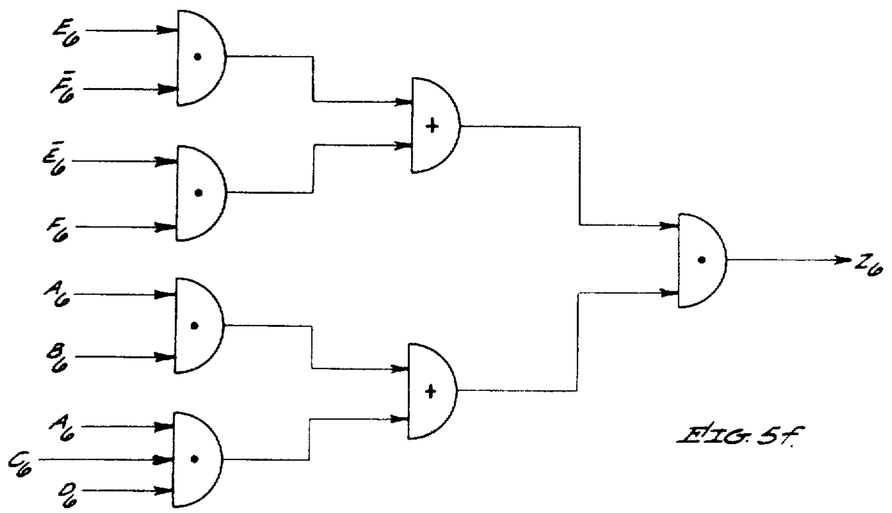
Figure 5G:
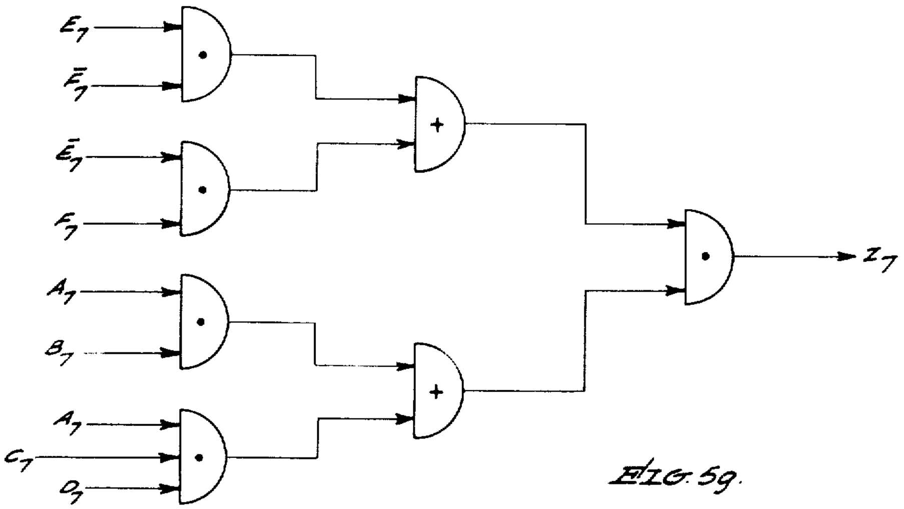

Referring now to FIGURE 3D, a flip-flop 236 which is set and reset by the following equation:

$$\text{Set } D_1 = E_1\overline{F}_1\overline{G}_1\ D_1\overline{K}+\overline{E}_1\overline{F}_1\overline{G}_1\ \overline{D}_1\overline{K}$$
$$+\overline{E}_1F_1\overline{G}_1\ D_1\overline{K}+E_1F_1\overline{G}_1\ \overline{D}_1\overline{K}$$
$$\text{Reset } D_1 = \overline{\text{Set}}\ \overline{D}_1$$

The FIGURE 3D illustrates a logic block diagram for implementation of the above equation where the set input of flip-flop 236 is enabled by the output of OR gate 238. OR gate 238 is enabled by the output of AND gates 240, 242, 244 or 246. AND gate 240 is enabled by an $\overline{E}_1$, an $\overline{F}_1$, a $\overline{G}_1$, a $D_1$ and a $\overline{K}$. The $E_1$ term indicates that a video return indicates a hit, a $\overline{F}_1$ indicates that the action bit is not enabled, $\overline{G}_1$ indicates that the previous threshold gate has not been enabled, the $D_1$ indicates that the least significant digit of the previous number stored in the memory is true.

AND gate 242 is enabled by an $\overline{E}_1$, $\overline{F}_1$, $\overline{G}_1$, $\overline{K}$ and a $\overline{D}_1$, the $\overline{D}_1$ indicating that the least significant digit of the previous stored number is false and the $\overline{E}_1$ that the video return represents a miss. AND gate 244 is enabled by an $\overline{E}_1$, an $F_1$, a $\overline{G}_1$, a $\overline{K}$ and a $D_1$, the $F_1$ indicating that the action bit in the read register 12 corresponding to this particular radar beam has the action bit enabled. AND gate 246 is enabled by an $E_1$, an $F_1$, a $\overline{D}_1$, a $\overline{K}$ and a $\overline{G}_1$, the $G_1$ indicating that the corresponding threshold gate previously stored was false. The output of OR gate 238 is also applied to the input of inverter 247 the output of which is applied as the reset signal to flip-flop 236.

In operation of this counter it is necessary for the counter of a specific channel to check the contents of the memory at a specific location and if the incoming signal is an E to increase the count 2 bits and if the incoming signal is an $\overline{E}$ to decrease the count one bit in the presence of an $\overline{F}$ and vice versa in the presence of an F. For example, the number in the memory is a 7 which is expressed in binary numbers as 0111, thus the input signal would be $\overline{A}BCD$. If the incoming signal is E then the counter must advance to 9 which is expressed binarily as 1001 or $A\overline{B}\overline{C}D$. Thus, the $\overline{A}$ much be changed to A and therefore flip-flop 10 must be true. One can note that AND gate 114 is enabled by $E_1$ if a $B_1$ and $C_1$ is present which it is for the No. 7. The B much change to $\overline{B}$ and the C much change to $\overline{C}$ and the D remains. Thus, it can be noted that flip-flop 142 does not become enabled on any condition if $\overline{A}BCD$ and an E and $\overline{F}$ is presented to any gate. Note that the reverse happens on $\overline{E}$ and F terms causing the counter 14 to seek a number less than 13 for determining that the target has diminished.

When $\overline{E}$ appears in the presence of $\overline{F}$ the counter 14 decreases one bit. This can be established by referring to the state of the memory 17 at a particular address location and decreasing the count one bit and enabling the appropriate flip-flop to the set or reset conditions.

Threshold detection logic and gates 16 provide enabling outputs $G_1$ through $G_7$ when the following equations are satisfied:

$$G_1=Z_1+X_{1-2}+W_2$$
$$G_2=Z_2+X_{1-2}+X_{2-3}+W_2+W_3$$
$$G_3=Z_3+X_{2-3}+X_{3-4}+W_2+W_3+W_4$$
$$G_4=Z_4+X_{3-4}+X_{4-5}+W_3+W_4+W_5$$
$$G_5=Z_5+X_{4-5}+X_{5-6}+W_4+W_5+W_6$$
$$G_6=Z_6+X_{5-6}+X_{6-7}+W_5+W_6$$
$$G_7=Z_7+X_{6-7}+W_6$$

where $$Z_1=(E_1\overline{F}_1+\overline{E}_1F_1)(A_1B_1+A_1C_1D_1)$$
$$Z_2=(E_2\overline{F}_2+\overline{E}_2F_2)(A_2B_2+A_2C_2D_2)$$
$$Z_3=(E_3\overline{F}_3+\overline{E}_3F_3)(A_3B_3+A_3C_3D_3)$$
$$Z_4=(E_4\overline{F}_4+\overline{E}_4F_4)(A_4B_4+A_4C_4D_4)$$
$$Z_5=(E_5\overline{F}_5+\overline{E}_5F_5)(A_5B_5+A_5C_5D_5)$$
$$Z_6=(E_6\overline{F}_6+\overline{E}_6F_6)(A_6B_6+A_6C_6D_6)$$
$$Z_7=(E_7\overline{F}_7+\overline{E}_7F_7)(A_7B_7+A_7C_7D_7)$$

and $$X_{1-2}=[A_1+B_1C_1D_1+B_1(E_1\overline{F}_1+\overline{E}_1F_1)][A_2+B_2C_2D_2+B_2(E_2\overline{F}_2+\overline{E}_2F_2)]\overline{Z}_1\overline{Z}_2$$
$$X_{2-3}[A_2+B_2C_2D_2+B_2(E_2\overline{F}_2+\overline{E}_2F_2)][A_3+B_3C_3D_3+B_3(E_3\overline{F}_3+\overline{E}_3F_3)]\overline{Z}_2\overline{Z}_3$$
$$X_{3-4}=[A_3+B_3C_3D_3+B_3(E_3\overline{F}_3+\overline{E}_3F_3)][A_4+B_4C_4D_4+B_4(E_4\overline{F}_4+\overline{E}_4F_4)]\overline{Z}_3\overline{Z}_4$$
$$X_{4-5}=[A_4+B_4C_4D_4+B_4(E_4\overline{F}_4+\overline{E}_4F_4)][A_5+B_5C_5D_5+B_5(E_5\overline{F}_5+\overline{E}_5F_5)]\overline{Z}_4\overline{Z}_5$$
$$X_{5-6}=[A_5+B_5C_5D_5+B_5(E_5\overline{F}_5+\overline{E}_5F_5)][A_6+B_6C_6D_6+B_6(E_6\overline{F}_6+\overline{E}_6F_6)]\overline{Z}_5\overline{Z}_6$$
$$X_{6-7}=[A_6+B_6C_6D_6+B_6(E_6\overline{F}_6+\overline{E}_6F_6)][A_7+B_7C_7D_7+B_7(E_7\overline{F}_7+\overline{E}_7F_7)]\overline{Z}_6\overline{Z}_7$$

$$W_2=[(\overline{F}_1\overline{F}_2\overline{F}_3)+(F_1F_2F_3)][(E_2\overline{F}_2+\overline{E}_2F_2)(B_2C_2+A_2)+A_2(B_2+C_2+D_2)][(E_1\overline{F}_1+\overline{E}_1F_1)(C_1+D_1)+\overline{A}_1B_1][(E_3\overline{F}_3+\overline{E}_3F_3)(C_3+D_3)+(\overline{A}_3B_3)]\overline{X}_{1-2}\overline{X}_{2-3}$$

$$W_3=[\overline{F}_2\overline{F}_3\overline{F}_4)+(F_2F_3F_4)][(E_3\overline{F}_3+\overline{E}_3F_3)(B_3C_3+A_3)+A_3(B_3+C_3+D_3)][(E_2\overline{F}_2+\overline{E}_2F_2)(C_2+D_2)+(A_2B_2)][(E_4\overline{F}_4+\overline{E}_4F_4)(C_4+D_4)+(\overline{A}_4B_4)]\overline{X}_{2-3}\overline{X}_{3-4}$$

$$W_4=[(\overline{F}_3\overline{F}_4\overline{F}_5)+(F_3F_4F_5)][(E_4\overline{F}_4+\overline{E}_4F_4)(B_4C_4+A_4)+A_4(B_4+C_4+D_4)][(E_3\overline{F}_3+\overline{E}_3F_3)(C_3+D_3)+\overline{A}_3B_3][(E_5\overline{F}_5+\overline{E}_5F_5)(C_5+D_5)+\overline{A}_5B_5]\overline{X}_{3-4}\overline{X}_{4-5}$$

$$W_5=[(\overline{F}_4\overline{F}_5\overline{F}_6)+(F_4F_5F_6)][(E_5\overline{F}_5+\overline{E}_5F_5)(B_5C_5+A_5)+A_5(B_5+C_5+D_5)][(E_4\overline{F}_4+\overline{E}_4F_4)(C_4+D_4)+(\overline{A}_4B_4)][(E_6\overline{F}_6+\overline{E}_6F_6)(C_6+D_6)+(\overline{A}_6B_6)]\overline{X}_{4-5}\overline{X}_{5-6}$$

$$W_6=[(\overline{F}_5\overline{F}_6\overline{F}_7)+(F_5F_6F_7)][(E_6\overline{F}_6+\overline{E}_6F_6)(B_6C_6+A_6)+A_6(B_6+C_6+D_6)][(E_5\overline{F}_5+\overline{E}_5F_5)(C_5+D_5)+(\overline{A}_5B_5)][(E_7\overline{F}_7+\overline{E}_7F_7)(C_7+D_7)+(\overline{A}_7B_7)]\overline{X}_{5-6}\overline{X}_{6-7}$$

The $G_1$ output from the threshold logic gates 16 is enabled by the terms $Z_1$ or $X_{1-2}$ or $W_2$. The $Z_1$ term indicates that a single beam detection has been declared on the $E_1$ output of the radar receiver 10. The $X_{1-2}$ indicates that two beam detection logic 20 has declared a target on the output $X_{1-2}$ and will be explained hereinafter. The $W_2$ indicates three beam detection logic indicating that three adjacent beams have declared a target on the $W_2$ output of the three beam detection logic 18. This logic is shown in FIGURE 4.

If a threshold gate, either $G_1$ through $G_7$ is enabled, it provides an output to the reversible counters and logic 14 for indicating therein that a target has been declared and also provides enabling terms to the write register 15 as shown in FIGURE 1. It provides the $G_1$ through $G_7$ terms for enabling the various $F_1$ through $F_7$ flip-flops as previously described.

The above logic equation can best be implemented by the following logic block diagram shown in FIGURE 4 wherein the terms $G_1$ through $G_7$ emanate from the OR gates 250, 252, 254, 256, 258, 260 and 262 respectively. Or gate 250 is enabled by the terms $Z_1$, $X_{1-2}$, or $W_2$. Where $Z_1$ indicates single beam detection from a single radar beam lobe of the $E_1$ signal from the radar receiver and quantizer 10, the $X_{1-2}$ being provided from the two beam detection logic 20 indicating that the $E_1$ and $E_2$ from the stacked beams received by the receiver and quantizer 10 each contain six bits in adjacent counters within the reversible counter logic 14 as previously described. The $W_2$ indicates that three beams satisfy the requirement that the center of three adjacent beams have counted 8 in its respective counter and the above and below beam has counted to at least 3, in their respective counters within the reversible counter and logic 14.

OR gate 252 is enabled by $Z_2$, $X_{1-2}$, $X_{2-3}$, $W_2$ or a $W_3$. Thus, if adjacent outputs $X_{1-2}$ and $X_{2-3}$ are enabled then a $G_2$ threshold gate is enabled providing the $G_2$ term. Too, if a $W_2$ or a $W_3$ is present simultaneously then the $G_2$ output is enabled. And finally if a $Z_2$ is enabled from a single beam detection logic then a $G_2$ gate is also enabled. The same holds true for the OR gate 254, when enabled by $X_{2-3}$, an $X_{3-4}$, a $W_2$, a $W_3$, a $W_4$ or a $Z_3$. OR gate 256 is enabled by an $X_{3-4}$, an $X_{4-5}$, a $W_3$, a $W_4$, a $W_5$ or a $Z_4$. OR gate 258 is enabled providing a $G_5$ term when an $X_{4-5}$, an $X_{5-6}$, a $W_4$, a $W_5$, a $W_6$ or a $Z_5$ is present. OR gate 260 provides the $G_6$ term to the write register and is enabled by an $X_{5-6}$, $X_{6-7}$, $W_5$, $W_6$ or a $Z_6$, and finally OR gate 262 provides a $G_7$ on its output and is enabled by an $X_{6-7}$, a $W_6$ or a $Z_7$.

With reference to FIGURES 5A through 5G single beam detection logic enables a $Z_1$ through $Z_7$ output if the previously stated equations are true wherein these figures illustrate, by way of an example, that $Z_1$ is enabled providing a single beam detection logic detection term when an $E_1$ beam is present from the radar receiver 10 and a $\overline{F}_1$ is present from the read register 12 indicating that no target has yet been stored and the output from the reversible counters 14 indicate that the count now present in the memory 17 is $A_1B_1$ which indicates that a count of 12 is stored, or an $A_1C_1D_1$ which indicates that a count of 11 is stored. On an incoming $E_1$ beam the contents of the reversible counter counts up two bits indicating a 13 or a 14 will be stored and the $G_1$ output from the threshold logic 16 will be enabled. The $E_1\overline{F}_1$ indicates a leading edge of a target is stored when the $E_1$ beam presents a valid target and an $\overline{F}_1$ indicates no target stored in memory 17, as previously stated. $Z_1$ is also enabled if an $\overline{E}_1$ and an $F_1$ is present indicating the target has diminished by the $\overline{E}_1$ which causes the counter to count down one bit and an $F_1$ indicating that a target has been stored and the counter has been reset and the contents of the counter falls below the 13 initial count the target value. This explanation will hold true for the $Z_2$ through $Z_7$ logic and will not be explained herein.

The two beam detection logic (X) 20 as shown in FIGURE 1 provides six outputs which when enabled indicates that adjacent E beams from the radar receiver 10 have counted six or more hits on the adjacent counters therein. For example, if the $X_{1-2}$ is enabled it indicates that the beam $E_1$ and $E_2$ from the stacked beams received by the receiver and quantizer 10 have each counted six hits. Likewise, if $X_{2-3}$ is enabled it indicates that $E_2$ and $E_3$ have counted six hits during their specific range bin times or address times, and therefore if adjacent beams indicate the required six or more count the threshold logic is satisfied and an appropriate G term is generated from the threshold detection logic 16. The X logic as previously stated is best implemented by the logic diagram as shown in FIGURE 6 and when taken in consideration with the previously stated equation an $A_1$ indicates, for an example, that the number 8 has previously been stored or the $B_1C_1D_1$ indicates that a 7 has previously been stored and therefore the next oncoming hit will increase the numbers to 10 or 9 respectively, or if a 4 or 5 is stored the $B_1$ is true and when taken in consideration that the next incoming $E_1$ term will cause the contents of the memory 17 to advance to 6 or 7 because of its increase by 2 increments and at the same time the adjacent beam has a 8 or 7 stored as indicated by the $A_2$ and the $B_2C_2D_2$ respectively or a 4 or 5 has been stored indicated by the $B_2$ and an $E_2$ term is forthcoming the output $X_{1-2}$ will be enabled indicating a target on two beams has been simultaneously generated. This is only true providing that no single beam detection has been found and this is indicated by the term $\overline{Z}_1$ and $\overline{Z}_2$. It should also be noted that an $\overline{E}_1F_1$ or an $\overline{E}_2F_2$ is used to indicate diminishing targets as previously stated. The same holds true for all of the outputs from the two-beam detection logic 20 for indicating targets by reference to adjacent beams.

The three-beam detection logic 18 as shown in FIGURES 7A through 7E provides the output terms $W_2$, $W_3$, $W_4$, $W_5$ and $W_6$. When one of these W terms is enabled by its logic gate it indicates that three adjacent beams from the radar receiver and quantizer 10 have their center beams containing a count of 8 or more and two adjacent beams having a count of 3 or more which is stored in its respective bin address locations within the memory 17. This is realized by the equation as previously stated.

Taking, for example, the $W_2$ output which is enabled by an $F_1F_2F_3$ which indicates that all the targets in these particular memory locations from the read register 12 are storing a target or, in the alternative, a $\overline{F}_1\overline{F}_2\overline{F}_3$ indicates no target stored. In either case three adjacent targets must show that they all have either stored targets or no stored targets. Also, to enable a $W_2$, for example, it is required that an $E_2\overline{F}_2$ or $\overline{E}_2F_2$ be present where an $E_2\overline{F}_2$ indicates incoming hits from the radar receiver 10 indicates a leading edge. While the $\overline{E}_2F_2$ indicates a trailing edge. Thus if the $E_2\overline{F}_2$ or the $\overline{E}_2F_2$ is present the counter shall be incremented to two bits. At this specific location the previous count already stored in the memory 17 is brought into the counter 17 for incrementation by the above $E_2F_2$ terms, and if, for example, the $A_2$ is present indicating that the data stored at this particular address location indicates an 8 or above it will advance the counter to a 10 which is sufficient for a center beam count in the three-beam detection logic. The same holds true for an $A_2$ and a $B_2$, or an $A_2$ and a $C_2$, or an $A_2$ and a $D_2$. Also, the logic then looks to the adjacent beams for exact example the one channel from the memory or the three channel from the memory for a count of 3 or more but less than 8, as indicated by the $C_1$ or $D_1$ and the $\overline{A}_1B_1$. It should also be noted that an $\overline{X}_{1-2}$ and an $\overline{X}_{2-3}$ is present to indicate that no target has been generated by the two-beam detection logic.

If the above existing conditions are provided to a $W_2$ an output will be enabled and applied to the threshold logic 16 to indicate that three adjacent beams meet the aforesaid requirements. The logic in the diagram for FIGURES 7B through 7E operate under the same conditions when adjacent E beams indicating a valid target.

In operation, the present invention sequentially and in a recirculating manner updates a plurality of radar beams which are in a stacked configuration. These conditions sampled by the threshold detection logic 16 and updated by the state of the new incoming beams for each particular range bin time. The condition of these particular range bins are stored in the memory 17 after each sample is circulated for updating when the range bin next appears in the radar receiver 10. Once a valid target has been determined this data is also stored in the memory address location until the output of the previous mentioned probability tables indicate that the target has diminished. At this time, memory location will indicate that a target no longer exists in this particular range bin.

Having thus described one embodiment of this invention what is claimed is:

1. In a data processor:
memory means for continually storing updated data in a plurality of address locations;
data input means, said data input means including a plurality of input channels for receiving data from different sources simultaneously, and including a plurality of output channels for furnishing output data;
recirculating means coupled between said memory means and said output channels of said data input means and being responsive to the reception of the output data from said output channels of said data input means for updating the data stored in the data address locations of said memory means, said recirculating means including reversible counting logic circuitry coupled to said data input means and being responsive to the stored data in said memory means and to the output data from said data input means for changing the stored data in said memory means; and
detection means coupled to said data input means for indicating preselected data conditions of said data input means.

2. In the data processor as defined in claim 1 including:
a read register coupled between said memory means and said recirculating means; and
a write register coupled between said recirculating means and said memory.

3. In the data processor as defined in claim 2 including:
means, coupled to said memory means and said output channels, for detecting the preselected conditions of the data stored in adjacent locations and responsive to the data of adjacent input channels.

4. In a data processor:
memory means for continually storing updated data in a plurality of address locations;
data input means, said data input means including a plurality of input channels for receiving data from different sources simultaneously, and including a plurality of output channels for furnishing output data;
recirculating means coupled between said memory means and said output channels of said data input means and being responsive to the reception to the output data from said output channels of said data input means for updating the data stored in the data address locations of said memory means; and
detection means coupled to said data input means for indicating preselected data conditions of said data input means, said detection means further including a plurality of threshold gates being enabled by the preselected conditions determined by the contents of said stored memory in relation to the data received by said plurality of input channels.

5. A data processing system comprising:
reversible counting means;
logic means coupled to said reversible counting means for enabling said counting means to increase predetermined increments of a first value equal to N when data in a first state is received and to decrease predetermined increments of a second value equal to $N/2$ when data in a second state is received; and
gating means coupled to said reversible counting means and being enabled when the contents of said reversible counting means reaches a predetermined count.

6. A data processing system comprising:

reversible counting means;

logic means coupled to said reversible counting means for enabling said counting means to increase predetermined increments of a first value when data in a first state is received and to decrease a predetermined increment of a second value when data in a second state is received;

gating means coupled to said reversible counting means and being enabled when the contents of said reversible counting means reaches a predetermined count; and a plurality of radar receivers coupled to said reversible counting means for receiving video returns, said radar receivers including means for digitizing said video returns and including a plurality of output means for distributing digitized video returns to said reversible counting means.

7. A data processing system as defined in claim 6 further comprising:

a memory device coupled to said logic means for storing video returns in a plurality of address locations corresponding to the respective ranges of each of the video returns.

8. A data processing system as defined in claim 6 further comprising:

a memory device coupled to said logic means for storing video returns in a plurality of address locations corresponding to the respective ranges of each of the video returns; and a plurality of radar receivers coupled to said reversible counting means for receiving video returns, said radar receivers including means for digitizing said video returns and including a plurality of output means for distributing digitized video returns to said reversible counting means.

9. The data processing system as defined in claim 8 further including a write register coupled between said gating means and said memory device.

10. The data processing system as defined in claim 9 further including a plurality of detection logic circuits coupled to said memory device and said gating means.

References Cited

UNITED STATES PATENTS

| | | | |
|---|---|---|---|
| 3,328,772 | 6/1967 | Oeters | 340—172.5 |
| 3,328,763 | 6/1967 | Rathbun et al. | 340—172.5 |
| 3,239,820 | 3/1966 | Logan et al. | 340—172.5 |
| 3,225,333 | 12/1965 | Vinal | 340—172.5 |
| 3,222,649 | 12/1965 | King et al. | 340—172.5 |
| 3,222,647 | 12/1965 | Strachey | 340—172.5 |
| 3,213,427 | 10/1965 | Schmitt et al. | 340—172.5 |
| 3,122,726 | 2/1964 | King et al. | 340—174.1 |
| 3,117,220 | 1/1964 | Wensley | 235—157 |
| 2,905,930 | 9/1959 | Golden | 340—174 |
| 2,874,371 | 2/1959 | Foster | 340—174 |
| 3,142,820 | 7/1964 | Daniels | 340—172.5 |

GARETH D. SHAW, Primary Examiner